(12) United States Patent
Liang et al.

(10) Patent No.: US 11,878,907 B2
(45) Date of Patent: Jan. 23, 2024

(54) TRACE NICKEL-COMPOUNDED LAYERED MAGNESIUM COMPOSITE MATERIAL AND PREPARATION METHOD AND USE THEREOF

(71) Applicant: Xuzhou University of Technology, Xuzhou (CN)

(72) Inventors: Hui Liang, Xuzhou (CN); Junxiang Zhu, Xuzhou (CN); Xinhui Shen, Xuzhou (CN); Baozhang Geng, Xuzhou (CN); Benliang Cao, Xuzhou (CN); Jiashun Deng, Xuzhou (CN); Sihang Zhu, Xuzhou (CN)

(73) Assignee: Xuzhou University of Technology, Xuzhou (CN)

( * ) Notice: Subject to any disclaimer, the term of this patent is extended or adjusted under 35 U.S.C. 154(b) by 0 days.

(21) Appl. No.: 18/145,117

(22) Filed: Dec. 22, 2022

(65) Prior Publication Data

US 2023/0294982 A1    Sep. 21, 2023

(30) Foreign Application Priority Data

Jan. 21, 2022 (CN) .......................... 202210069627.7

(51) Int. Cl.
*C01B 3/00* (2006.01)
(52) U.S. Cl.
CPC ........ *C01B 3/0042* (2013.01); *C01P 2004/64* (2013.01)
(58) Field of Classification Search
CPC ... C01B 3/0005; C01B 3/0042; C01B 3/0078; C01P 2004/64; Y02E 60/32; C22C 23/00;

(Continued)

(56) References Cited

U.S. PATENT DOCUMENTS 5,964,965 A    10/1999  Schulz et al.
8,481,151 B2*  7/2013   Uchiyama ............... C22C 49/04
                                                          423/644

(Continued)

FOREIGN PATENT DOCUMENTS

CN          106566965 A     4/2017

OTHER PUBLICATIONS

Shao, H., et al., Fabrication and hydrogen storage property study of nanostructured Mg—Ni—B ternary alloys, Journal of Alloys and Compounds 479 (2009) 409-413.

(Continued)

*Primary Examiner* — Frank M Lawrence, Jr.
(74) *Attorney, Agent, or Firm* — AVEK IP, LLC

(57) ABSTRACT

Some embodiments of the disclosure provide a trace nickel-compounded layered magnesium composite material, a method for preparing the composite material, and use thereof. In some examples, the trace nickel-compounded layered magnesium composite material includes a nano-layered magnesium matrix and nano nickel. The nano nickel is distributed on a surface and between inner layers of the nano-layered magnesium matrix. In other examples, the nano-layered magnesium matrix in the composite material has a size of 10-20 nm, a layer thickness of 10-200 nm, and a layer spacing of 10-100 nm. The mass content of the nano nickel in the composite material is 2-6%. The nano nickel in the composite material has a particle size of 3-50 nm.

1 Claim, 24 Drawing Sheets

(58) Field of Classification Search
CPC ....... C22C 1/05; C22C 2202/04; B82Y 30/00; B82Y 40/00
USPC ................ 420/402, 900; 206/0.7; 423/658.2
See application file for complete search history.

(56) References Cited

U.S. PATENT DOCUMENTS

2005/0126663 A1* 6/2005 Fetcenko .............. C01B 3/0031
                                                       148/420
2018/0195205 A1* 7/2018 Urban .................... C30B 29/10

OTHER PUBLICATIONS

Lu, C., et al., Visualization of fast "hydrogen pump" in core-shell nanostructured Mg@Pt through hydrogenstabilized Mg3Pt, J. Mater. Chem. A, 2019, 7, 14629.

First Office Action issued by China National Intellectual Property Administration (CNIPA) dated Jul. 11, 2022 regarding Chinese Patent Application No. 202210069627.7 filed on Jan. 21, 2022.

* cited by examiner

TRACE NICKEL-COMPOUNDED LAYERED MAGNESIUM COMPOSITE MATERIAL AND PREPARATION METHOD AND USE THEREOF

CROSS REFERENCE TO RELATED APPLICATIONS

This application claims priority to Chinese patent application number 202210069627.7, filed on Jan. 21, 2022, the disclosure of which is incorporated by reference herein in its entirety.

FIELD OF THE DISCLOSURE

The disclosure relates generally to the field of composite materials. More specifically, the disclosure relates to trace nickel-compounded layered magnesium composite materials and preparation methods and use thereof.

BACKGROUND

Hydrogen is considered as one of the optimal choices for green energy because of its cleanness and high energy density. One of the most important obstacles hindering the development of hydrogen energy is the lack of safe, efficient, and economical hydrogen storage materials. At present, the use of magnesium (Mg) to store hydrogen has a huge market prospect in the development of hydrogen vehicles. The magnesium have outstanding advantages of high theoretical hydrogen storage density (7.6 wt. %), abundant reserves, high cost-effectiveness, low density, and low toxicity. However, in terms of hydrogen absorption and desorption efficiency and cycle stability, magnesium has two main disadvantages, namely, high desorption temperature and slow hydrogen absorption kinetics. In addition, magnesium is easily oxidized, forming an oxide layer on the surface, which hinders the diffusion of hydrogen.

Generally, these problems may be solved by reducing the size of metal particles to "nano" size and/or using catalysts. In addition, many preparation strategies (recombination, alloying, and doping) have been reported to prevent the oxidation of magnesium in nano magnesium based materials and be used for hydrogen storage applications. $Mg_2Ni$ alloy has been proved to be effective in regulating and optimizing the activation energy of Mg hydrogen storage, but its hydrogen storage capacity is 3.4-3.6 wt. %, far lower than the theoretical hydrogen storage capacity of Mg. Enoki studied $MgNi_xM_{0.03}$ (M=Cr, Fe, Co, Mn) alloy and found that $MgNi_{0.86}Cr_{0.03}$ alloy began to desorb hydrogen at 150° C. and 0.01-0.1 MPa, and the amount of desorbed hydrogen was only 0.4 wt. % (Shao, H., Asano, K., Enoki, H., Akiba, E., Fabrication and hydrogen storage property study of nanostructured Mg—Ni—B ternary alloys. J. Alloy. Compd., 2009, 479, 409-413). Unfortunately, so far, none of these magnesium alloys fully meet the requirements of the U.S. Department of Energy (DOE). Zou et al. (Lu, C., Ma, Y. L., Li, F., Zhu, H., Zeng, X. Q., Ding, W. J., Wu, J. B., Deng, T., Zou, J. X., *Visualization of fast "hydrogen pump" in core-shell nanostructured Mg@Pt through hydrogen stabilized $Mg_3Pt$*. J. Mater. Chem. A. 2019, 7, 14629-14637) used Pt as the dopant for icosahedral Mg particles, many interfaces were formed between Mg and Pt, and the additional interface free energy reduced the desorption temperature of hydrogen to a certain extent. However, the current technologies are complex and costly, and little attention is paid to the formation of new phases and changes in the interface structure, as well as the role of new phases formed by these trace doping elements in the catalytic hydrogenation/dehydrogenation process.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a trace nickel-compounded layered magnesium composite material, including a nano-layered magnesium matrix and nano nickel, the nano nickel being distributed on a surface and between inner layers of the nano-layered magnesium matrix.

Optionally, the nano-layered magnesium matrix has a size of 10-20 nm, the nano-layered magnesium matrix has a layer thickness of 10-200 nm and the nano-layered magnesium matrix has a layer spacing of 10-100 nm.

Optionally, a mass content of the nano nickel in the composite material is 2-6%.

Optionally, the nano nickel has a particle size of 3-50 nm.

In other embodiments, the disclosure provides a method for preparing the composite material according to the present disclosure, including the following steps: mixing magnesium powder, nickel salt, and organic solvent and conducting a solid-liquid separation to obtain a mixture and calcining the mixture in a reducing atmosphere to obtain the trace nickel-compounded layered magnesium composite material.

Optionally, the nano-layered magnesium matrix has a size of 10-20 nm, the nano-layered magnesium matrix has a layer thickness of 10-200 nm and the nano-layered magnesium matrix has a layer spacing of 10-100 nm.

Optionally, the nickel salt includes at least one item selected from the group consisting of nickel acetylacetonate, nickel acetate, and nickel carbonate.

Optionally, the magnesium powder and the nickel salt have a mass ratio of 1:(0.1-0.3).

Optionally, a mass content of the nano nickel in the composite material is 2-6%.

Optionally, the nickel salt includes at least one item selected from the group consisting of nickel acetylacetonate, nickel acetate, and nickel carbonate.

Optionally, the magnesium powder and the nickel salt have a mass ratio of 1:(0.1-0.3).

Optionally, the nano nickel has a particle size of 3-50 nm.

Optionally, the nickel salt includes at least one item selected from the group consisting of nickel acetylacetonate, nickel acetate, and nickel carbonate.

Optionally, the magnesium powder and the nickel salt have a mass ratio of 1:(0.1-0.3).

Optionally, the nickel salt includes at least one item selected from the group consisting of nickel acetylacetonate, nickel acetate, and nickel carbonate.

Optionally, the magnesium powder and the nickel salt have a mass ratio of 1:(0.1-0.3).

Optionally, the organic solvent includes at least one item selected from the group consisting of tetrahydrofuran (THF), dichloromethane, and tetrachloromethane.

Optionally, the mixture is calcined in the reducing atmosphere at 600-900° C. for 20-60 min.

In further embodiments, the disclosure provides a hydrogen storage material, including the trace nickel-compounded layered magnesium composite material according to the present disclosure.

Optionally, the present disclosure provides a use of the trace nickel-compounded layered magnesium composite material according to the above technical solutions or a trace nickel-compounded layered magnesium composite material prepared by the preparation method according to the above technical solutions as a hydrogen storage material.

BRIEF DESCRIPTION OF THE DRAWINGS

Illustrative embodiments of the present disclosure are described in detail below with reference to the attached drawing figures.

DETAILED DESCRIPTION

Figure 1:
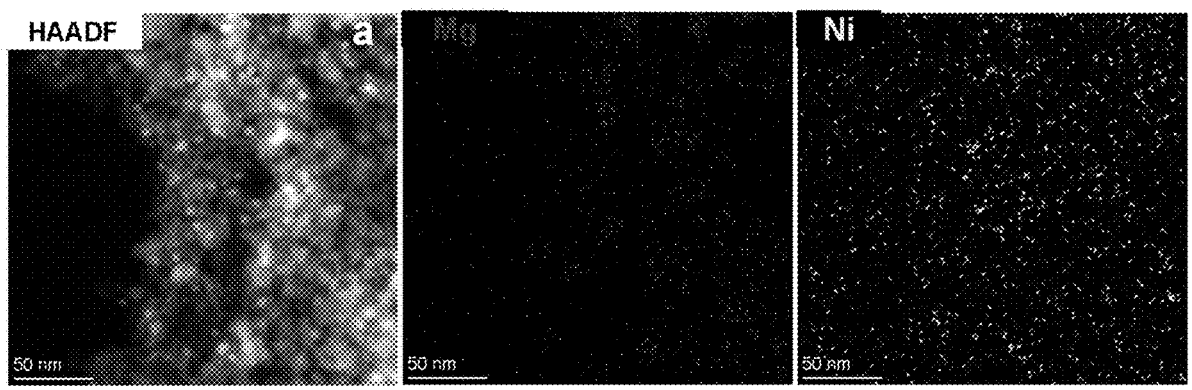
FIG. 1 shows high resolution images and elemental energy spectra of a Ni@Mg nanomaterial prepared in Example 1.

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The present disclosure provides a trace nickel-compounded layered magnesium composite material, including a nano-layered magnesium matrix and nano nickel distributed on a surface and between inner layers of the nano-layered magnesium matrix.

The trace nickel-compounded layered magnesium composite material provided by the present disclosure may include the nano-layered magnesium matrix. In the present disclosure, the nano-layered magnesium matrix has a size of preferably 100-200 nm$^2$, a layer thickness of preferably 10-200 nm, more preferably 30-100 nm, and a layer spacing of preferably 10-100 nm, more preferably 10-50 nm.

The trace nickel-compounded layered magnesium composite material provided by the present disclosure may include the nano nickel distributed on the surface and between the layers of the nano-layered magnesium matrix. In the present disclosure, taking a mass of the trace nickel-compounded layered magnesium composite material of 100%, the nano nickel has a mass content of preferably 2-6%, more preferably 4-5%. In the present disclosure, the nano nickel has a particle size of preferably 3-50 nm, more preferably 3-10 nm.

In the present disclosure, the nano nickel is preferably modified on the nano-layered magnesium matrix by an Mg—Ni bond.

In the present disclosure, the trace nickel-compounded layered magnesium composite material further may include magnesium nickel compounds distributed on the surface and between the layers of the nano-layered magnesium matrix. The magnesium nickel compounds are MgNi and MgNi$_2$. In the present disclosure, the magnesium nickel compounds have a mass content of preferably 1-5%.

The present disclosure further provides a preparation method of the trace nickel-compounded layered magnesium composite material according to the above technical solutions, including the following steps.

Magnesium powder, nickel salt, and an organic solvent are mixed, and solid-liquid separation is conducted to obtain a mixture.

The mixture is calcined in a reducing atmosphere to obtain the trace nickel-compounded layered magnesium composite material.

The present disclosure adopts a conventional solid phase method to prepare the trace nickel-compounded layered magnesium composite material, and the preparation method is simple and easy to operate.

In the present disclosure, the magnesium powder, the nickel salt, and the organic solvent are mixed, and solid-liquid separation is conducted to obtain the mixture. In the present disclosure, the magnesium powder is preferably nano magnesium, and has a particle size of preferably 10-20 nm. In the present disclosure, the preparation method of the magnesium powder preferably may include: mixing naphthalene, lithium, and an organic solvent, conducting a redox reaction to obtain a lithium naphthalene system; and dropwise adding a methyl magnesium chloride solution into the lithium naphthalene system for a reduction reaction to obtain the magnesium powder. In the present disclosure, the magnesium powder is preferably prepared in an argon atmosphere. In the present disclosure, the naphthalene and the lithium have a mass ratio of preferably (0.1-5):(0.01-2). In the present disclosure, the organic solvent is preferably selected from the group consisting of THF, dichloromethane, tetrachloromethane, chloroform, and anhydrous ethylene glycol. In the present disclosure, the naphthalene and the organic solvent have a mass ratio of preferably 2 g:30 mL. In the present disclosure, the redox reaction is conducted at preferably 30-80° C., more preferably 60-70° C., for preferably 1-24 h, more preferably 5-10 h, under reflux conditions. In the present disclosure, the lithium naphthalene is dark green. In the present disclosure, the solvent of the methyl magnesium chloride (MeMgCl) solution is preferably THF. The methyl magnesium chloride solution has a concentration of preferably 3.0 mol/L. In the present disclosure, the methyl magnesium chloride solution, lithium, and naphthalene have a dosage ratio of preferably 50 mL:0.1 g:2 g. In the present disclosure, the reduction reaction is conducted at preferably 30-115° C., more preferably 55-100° C., for preferably 2-48 h, more preferably 24 h. In the reduction reaction process of the present disclosure, Mg ions are reduced into metal Mg cores and further aggregated into nano particles. The present disclosure preferably conducts solid-liquid separation on the obtained system after the reduction reaction, and the solid substances are washed and dried sequentially to obtain the magnesium powder. In the present disclosure, the solid-liquid separation method is preferably centrifugation. The detergent for washing is preferably THF. The drying is preferably conducted in an argon atmosphere. In the present disclosure, the magnesium powder has an oxygen content of preferably 0.001-10 ppm and a water content of preferably 0.001-10 ppm.

After the magnesium powder is prepared, the present disclosure mixes the magnesium powder, the nickel salt, and the organic solvent and conducts solid-liquid separation to obtain the mixture. In the present disclosure, the nickel salt is preferably selected from the group consisting of nickel acetylacetonate, nickel acetate, and nickel carbonate. In the present disclosure, the magnesium powder and the nickel salt have a mass ratio of preferably 1:(0.1-0.3), more preferably 1:(0.15-0.2). In the present disclosure, the organic solvent is preferably selected from the group consisting of THF, dichloromethane, and tetrachloromethane. In the present disclosure, the magnesium powder and the organic solvent have a dosage ratio of preferably 1 g:(10-80) mL, more preferably 1 g:(30-50) mL. In the present disclosure, the solid-liquid separation is preferably centrifugation and filtration. The present disclosure preferably dries the solid substances obtained after the solid-liquid separation to obtain the mixture. In the present disclosure, the drying is preferably conducted in a vacuum drying oven at preferably a room temperature. In the present disclosure, the mixture is a mixture of the magnesium powder and nickel salt uniformly dispersed.

After the mixture is obtained, the present disclosure calcines the mixture in a reducing atmosphere to obtain the trace nickel-compounded layered magnesium composite material. In the present disclosure, the reducing atmosphere is preferably Ar—CO atmosphere. The flow rate of the Ar is preferably 10 mL/min. The flow rate of the CO is preferably 3 mL/min. In the present disclosure, the calcination is preferably conducted at 600-900° C., more preferably 700-800° C., for preferably 20-60 min. In the present disclosure, it takes preferably 50-156 min from the room temperature to the calcination temperature. In the calcination process of the present disclosure, the magnesium powder becomes layered, and the nickel salt is decomposed and reduced into the nano nickel, which is attached to the layered magnesium matrix.

The present disclosure further provides a use of the trace nickel-compounded layered magnesium composite material according to the above technical solutions or a trace nickel-compounded layered magnesium composite material prepared by the preparation method according to the above technical solutions as a hydrogen storage material.

The technical solutions of the present disclosure will be described below clearly and completely in conjunction with the examples of the present disclosure. Apparently, the described examples are only a part of, not all of, the examples of the present disclosure. All other examples obtained by those of ordinary skill in the art based on the examples of the present disclosure without creative efforts shall fall within the protection scope of the present disclosure.

Raw Materials Used in Examples

Methyl magnesium chloride solution: the solvent was THF, and the concentration was 3.0 mol/L.

THF: with a purity of 99.8%, purchased from Aladdin chem.

Lithium and naphthalene were purchased from Sigma-Aldrich chem.

Example 1

Preparation of nano magnesium: synthesis in an argon-filled glove box. First, 2 g of naphthalene, 0.1 g of Li, and 30 mL of THF were added to a three-neck round-bottomed flask equipped with a mechanical stirrer and a reflux condenser, and after reflux of a mixed solution at 60° C. for 5 h, lithium metal reacted with naphthalene to form lithium naphthalene, which was dark green. Then, 50 mL of a MeMgCl solution (with a concentration of 3.0 mol/L) was dropped into the above mixed solution, and stirred at 55° C. for 24 h. Mg ions were reduced to metal Mg cores, which were further aggregated into nano particles by Li-naphthalene in the solution. After centrifugal separation, the nano particles were washed with THF, and dried in an argon atmosphere to obtain magnesium powder. The oxygen and water content of the magnesium powder were both kept less than or equal to 1 ppm.

Preparation of Ni@Mg nanomaterial: 1 g of the magnesium powder and 0.26 g of nickel acetylacetonate were added to the bottom of the flask. Then, 30 mL of THF was added, stirred and mixed to obtain the suspension. After centrifugation and filtration, the obtained solid substances were dried in a vacuum drying oven at a room temperature to form a mixture of magnesium and fully dispersed nickel acetylacetonate. The mixture was heated to 800° C. within 156 min and kept in Ar—CO (10-3 mL/min) for 60 min to obtain a trace nickel-compounded layered magnesium composite material (Ni@Mg nanomaterial).

Example 2

This example was basically the same as Example 1 except that: during preparation of the Ni@Mg nanomaterial, the mass of nickel acetylacetonate was adjusted from "0.26 g" to "0.22 g".

Example 3

This example was basically the same as Example 1 except that: during preparation of the Ni@Mg nanomaterial, the mass of nickel acetylacetonate was adjusted from "0.26 g" to "0.17 g".

Test Example

The morphology and microstructure of the samples were observed using a FEI Talos F200X S/TEM and a 200 kV field emission gun (FEG), and energy dispersive X-ray spectroscopy (EDS) attached to the TEM.

X-ray diffraction (XRD) characterization was conducted using a powder diffractometer (rigakud (max 2500), Japan) with a tube voltage of 40 kV, a tube current of 30 mA, a scanning speed of 10°/min, a scanning range of 2θ=5°–90°, and a step of 0.02°. XRD measurements were used to fundamentally understand phase transitions during hydrogenation and dehydrogenation.

X-ray photoelectron spectroscopy (XPS) characterization was conducted on a Thermo Scientific K-alpha XPS system (Thermo Fisher Scientific, UK).

X-ray absorption fine structure (XAFS) measurements of NIK edges in transmission mode were conducted on BL14W1 at the Shanghai Synchrotron Radiation Facility (SSRF). The electron beam energy was 3.5 GeV, and the storage current was 230 mA (top-up). The energy was calibrated by referencing the standard energy (8,333 eV) at the K edge of the nickel foil K.

The temperature-programmed non-isothermal hydrogen uptake of the samples was studied using a cantar instrument dynamic chemisorption instrument with a thermal conductivity detector (TCD) connected to a quartz reactor in a tube furnace. 100 mg of sample was used for each measurement.

Figure 2:
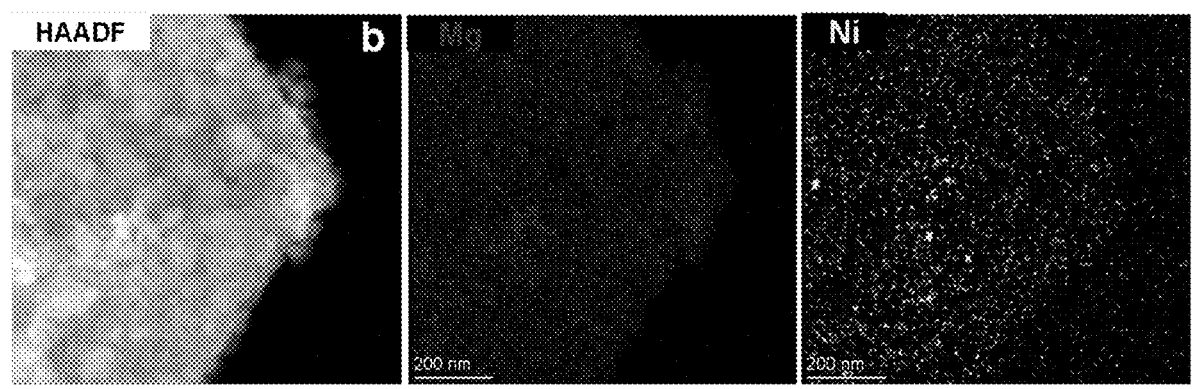
FIG. 2 shows high resolution images and elemental energy spectra of a Ni@Mg nanomaterial prepared in Example 2.
Figure 3:
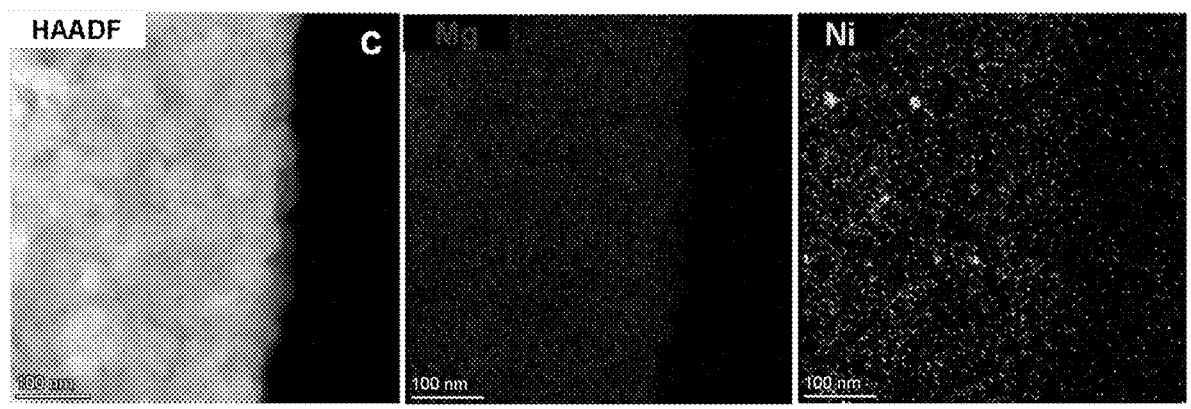
FIG. 3 shows high resolution images and elemental energy spectra of a Ni@Mg nanomaterial prepared in Example 3.

(1) FIG. 1 to FIG. 3 show high resolution images and elemental energy spectra of the Ni@Mg nanomaterial prepared in Examples 1 to 3. The nickel content in FIG. 1 is 6%, the nickel content in FIG. 2 is 5%, and the nickel content in FIG. 3 is 2%.

Figure 4A:
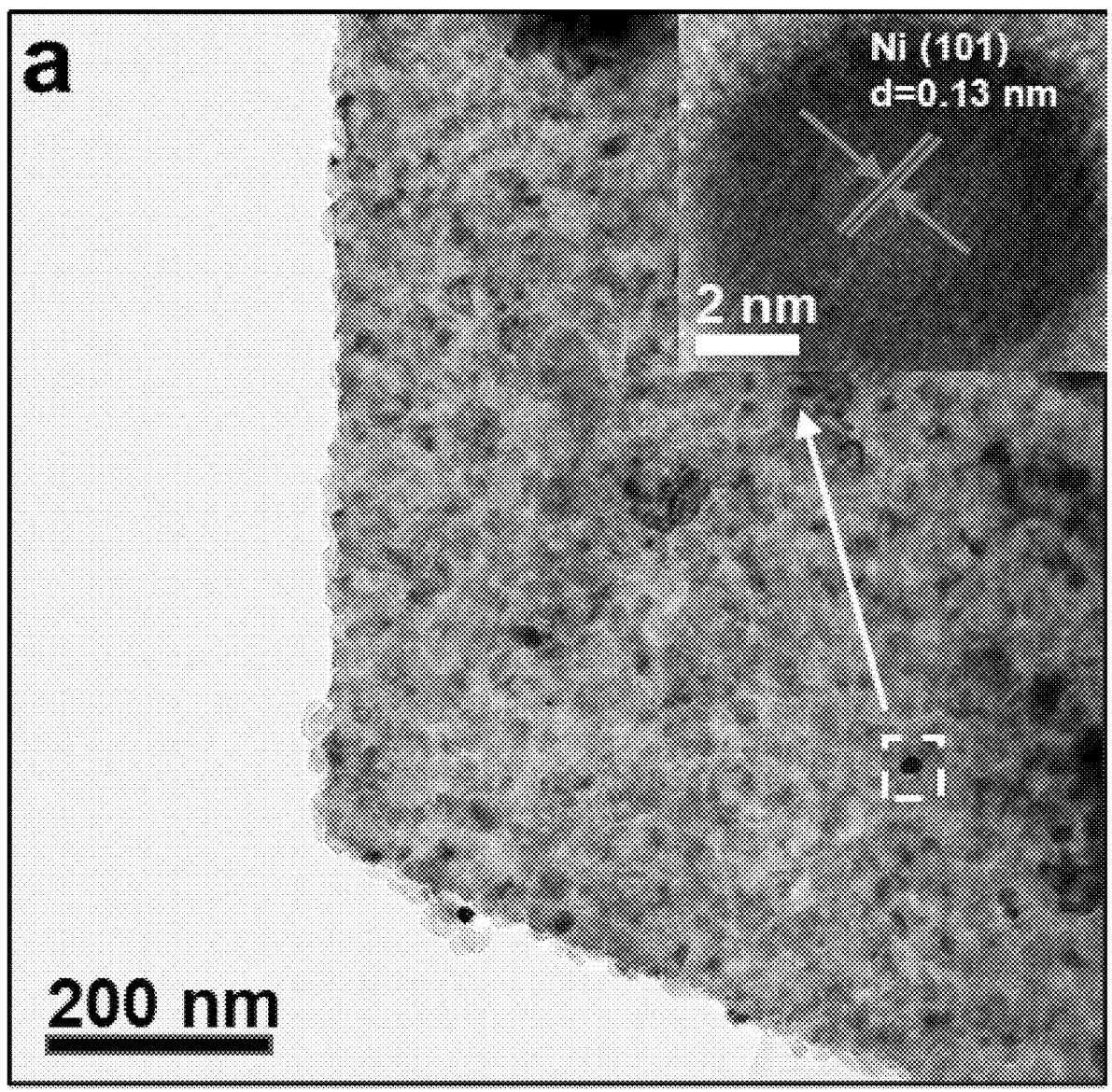
FIG. 4A shows a transmission electron microscope (TEM) image of the Ni@Mg nanomaterial prepared in Example 3.
Figure 4B:
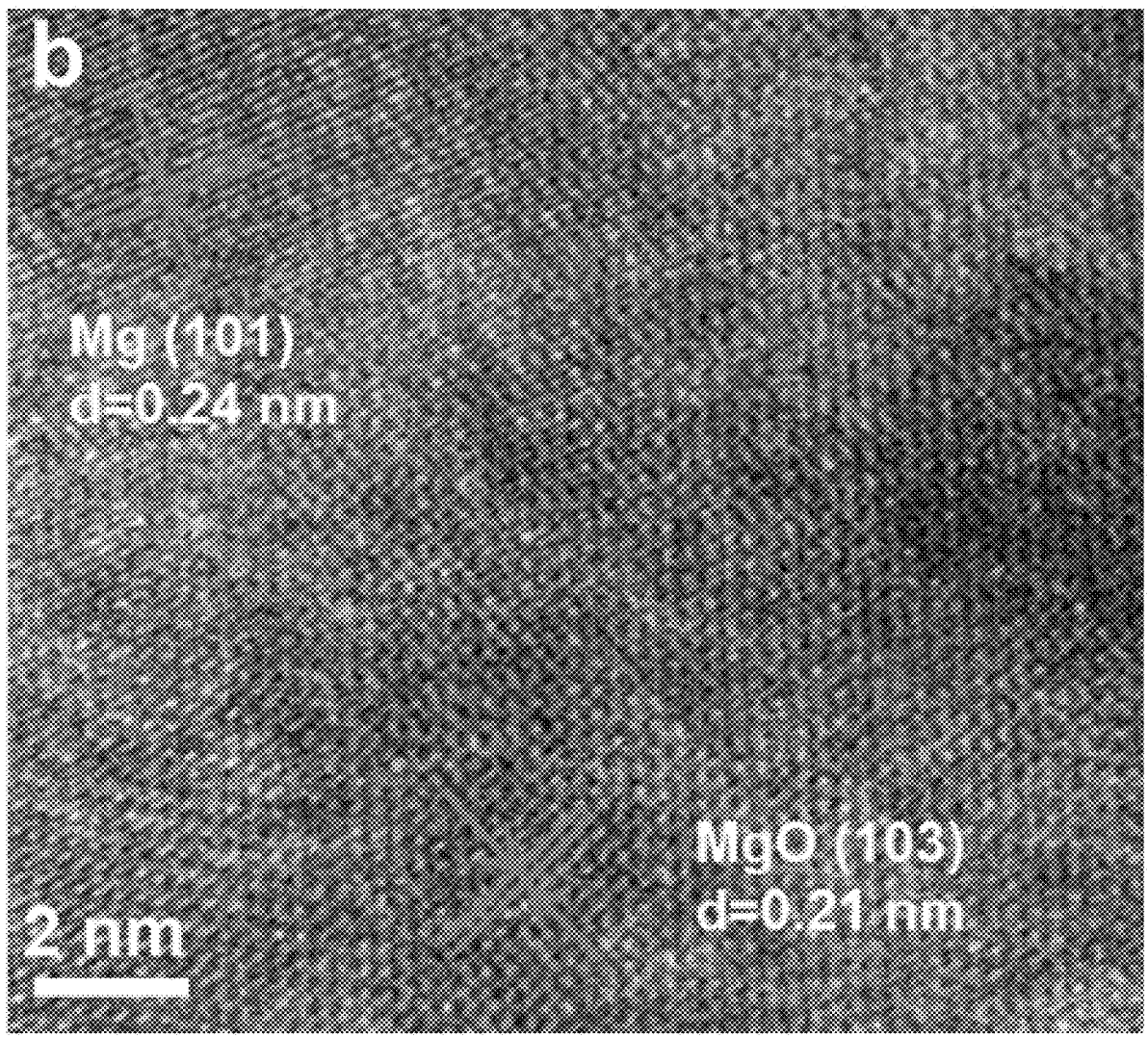
FIG. 4B shows a high resolution transmission electron microscope (HRTEM) image of the Ni@Mg nanomaterial prepared in Example 3.

(2) The TEM, HRTEM, and high-angle annular dark-field scanning transmission electron microscopy (HAADF-STEM) and energy-dispersive X-ray scanning transmission electron microscopy (EDX-STEM) were used to characterize the morphology and microstructure of the Ni@Mg nanomaterial prepared in Example 3. It is observed that the nickel nano particles are uniformly dispersed on magnesium (FIG. 4A). According to the HRTEM image (FIG. 4B), well-resolved continuous fringes may be observed. From the HRTEM fringes, it may be clearly observed that there are (103) surface (d=0.24 nm) Mg and (101) surface (d=0.13 nm) Ni. It may be seen that according to the HAADF-STEM image, nickel particles are uniformly distributed. The element Mg is located at 32.2°, 34.4°, 36.6°, and 63°, and the composite material also may include the peaks at 44.3° and 76.3°, belonging to Ni.

Figure 5:
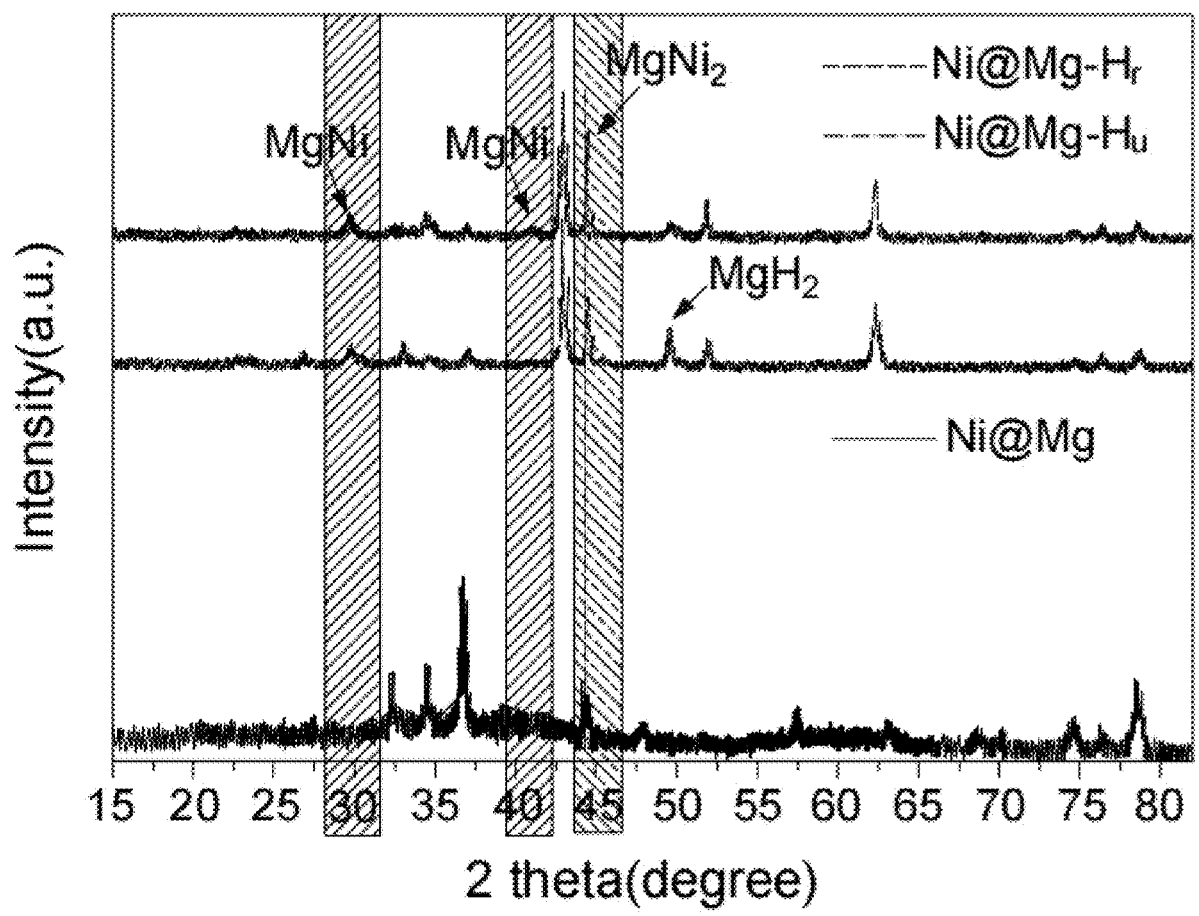
FIG. 5 shows an X-ray diffraction pattern of a Ni@Mg nanomaterial, hydrogenated Ni@Mg, and dehydrogenated Ni@Mg.

(3) FIG. 5 shows an X-ray diffraction pattern of the Ni@Mg nanomaterial prepared in Example 3, where Ni@Mg—$H_r$ represents dehydrogenated Ni@Mg, and Ni@Mg—$H_u$ represents hydrogenated Ni@Mg. In the process of hydrogen absorption, metal nickel and a series of magnesium-nickel intermetallic compounds with different atomic ratios are formed. In particular, MgNi and $MgNi_2$ appear in the hydrogenation catalyst Ni@Mg system, which exhibits excellent hydrogenation and dehydrogenation performance. MgNi and Ni do have a lower hydrogen adsorption energy barrier than MgO, which accelerates the decomposition of $H_2$ molecules into H atoms and the diffusion of H atoms between the subsurface and the surface.

Figure 6A:
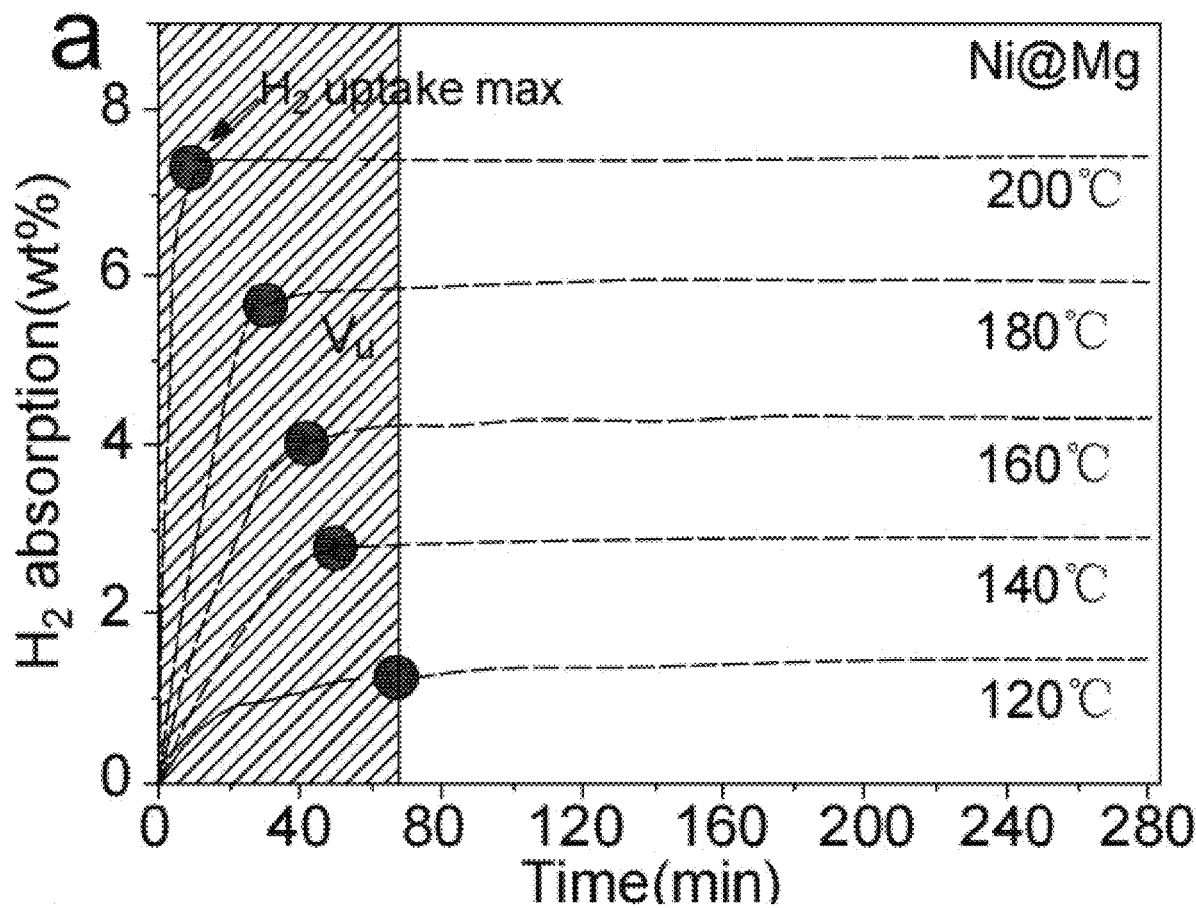
FIG. 6A shows a hydrogen absorption curve of the Ni@Mg nanomaterial prepared in Example 3.
Figure 6B:
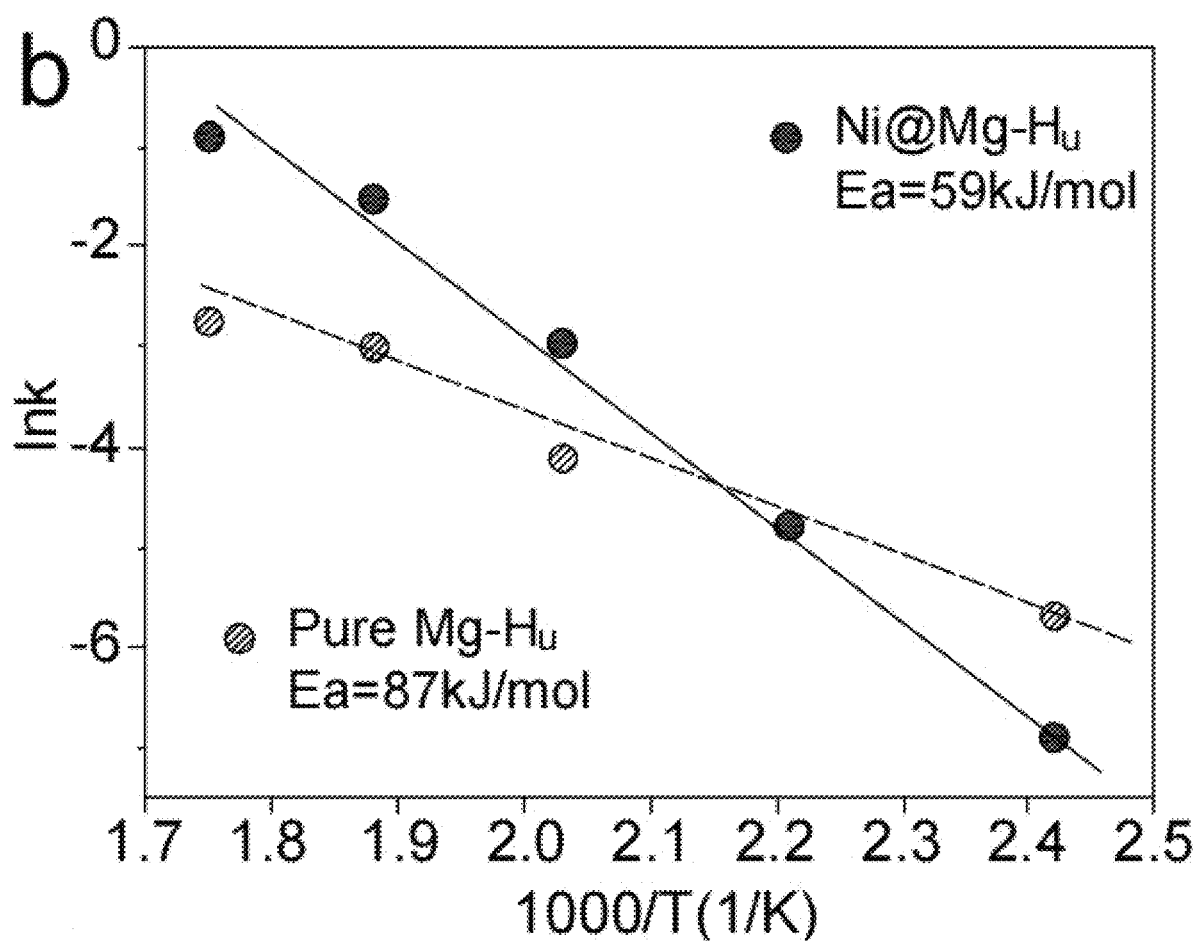
FIG. 6B shows a hydrogen desorption curve of hydrogenated Ni@Mg—H prepared in Example 3.
Figure 6C:
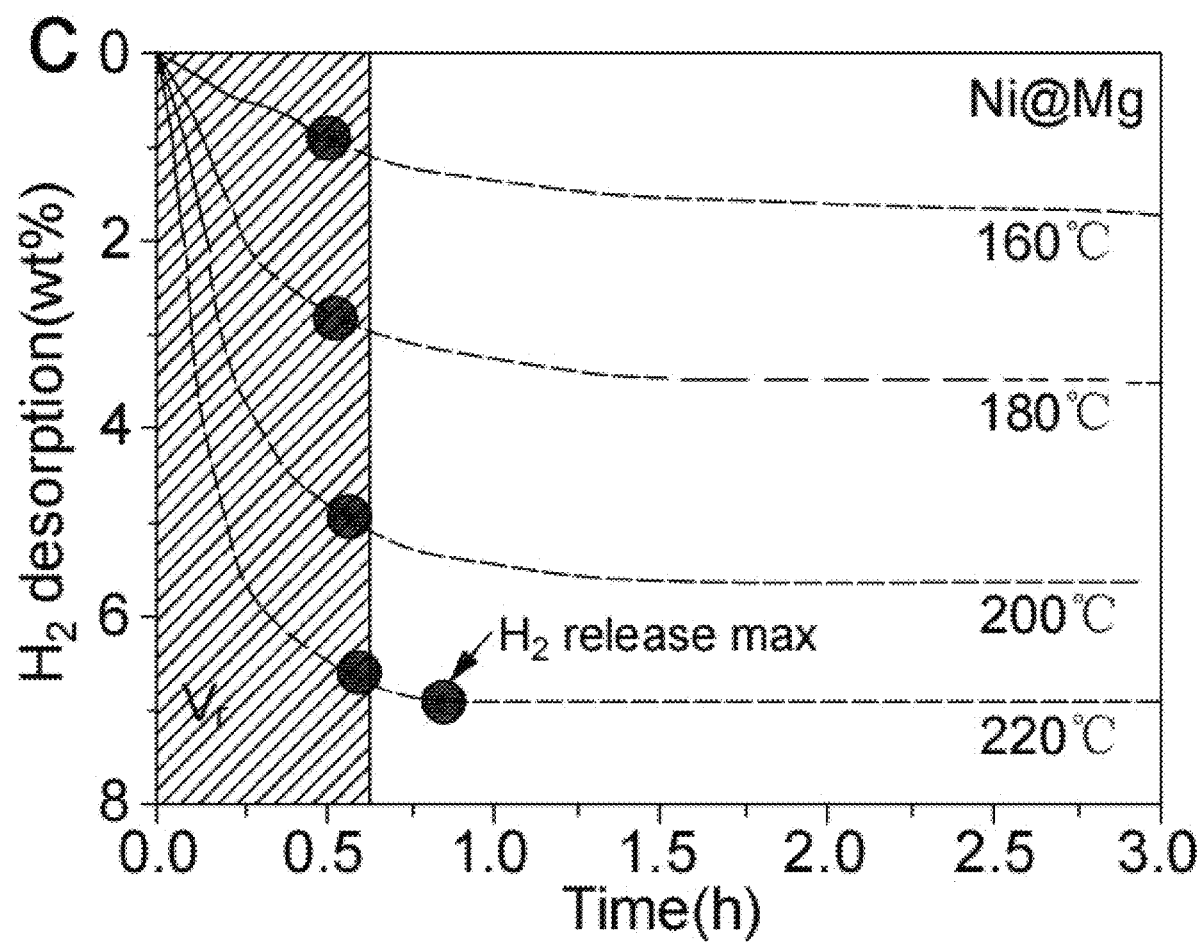
FIG. 6C shows a fitting diagram of hydrogen absorption of the Ni@Mg nanomaterial and pure magnesium prepared in Example 3.
Figure 6D:
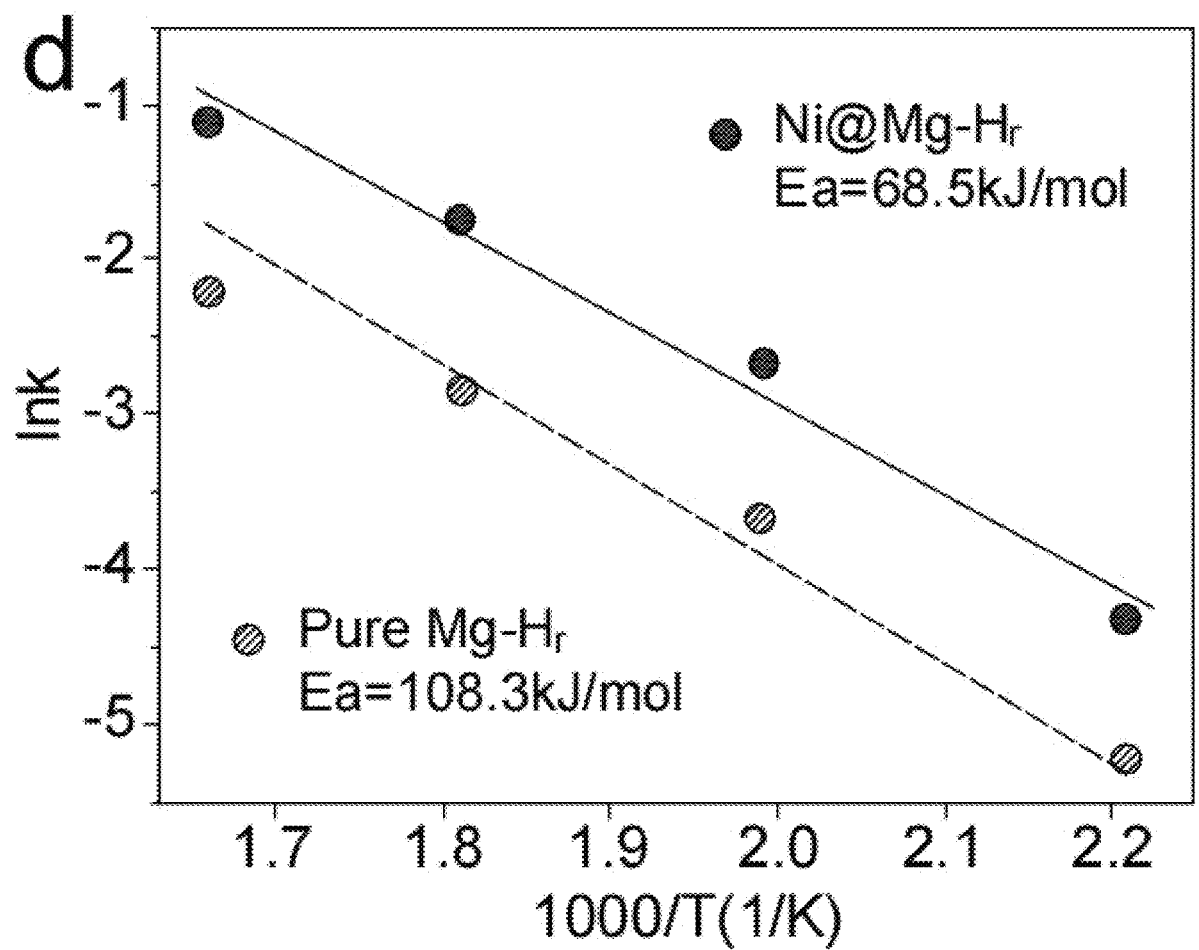
FIG. 6D shows a fitting diagram of dehydrogenation of the Ni@Mg prepared in Example 3.
Figure 6E:
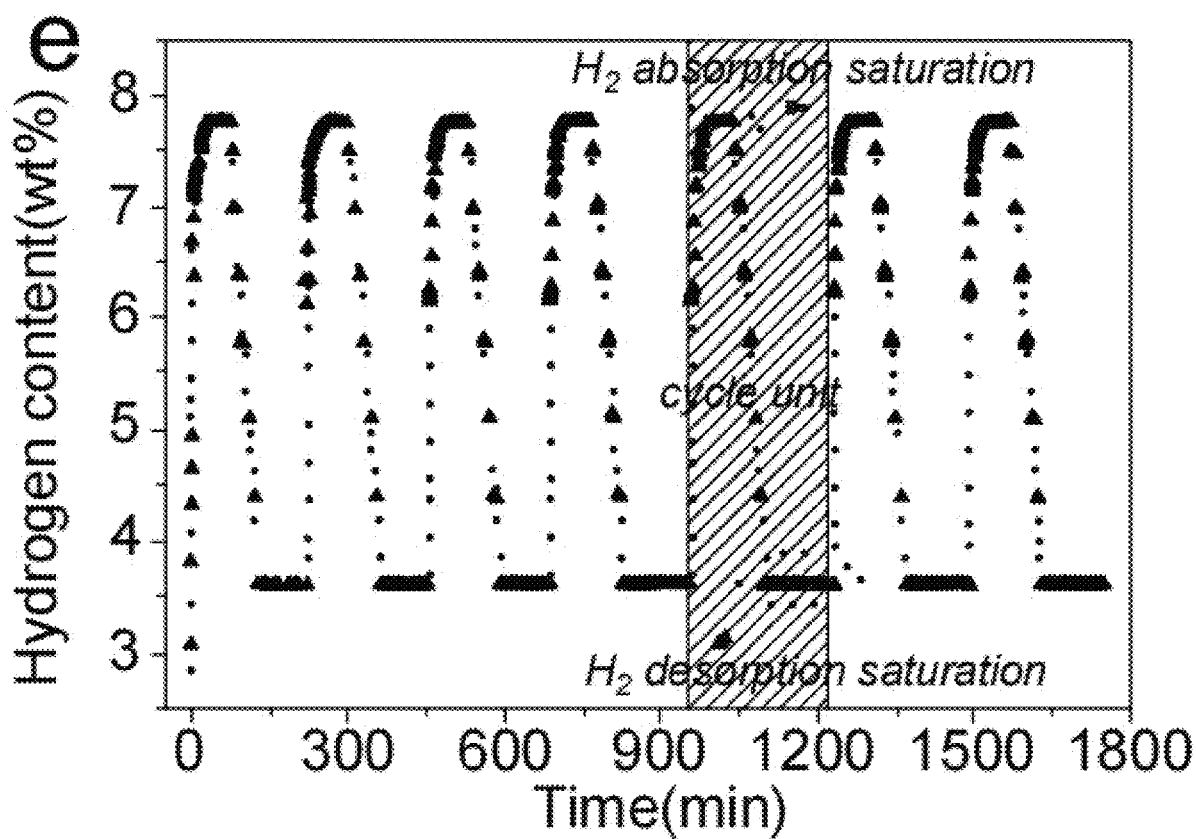
FIG. 6E shows a hydrogen adsorption and desorption cycle of the Ni@Mg nanomaterial prepared in Example 3.
Figure 6F:
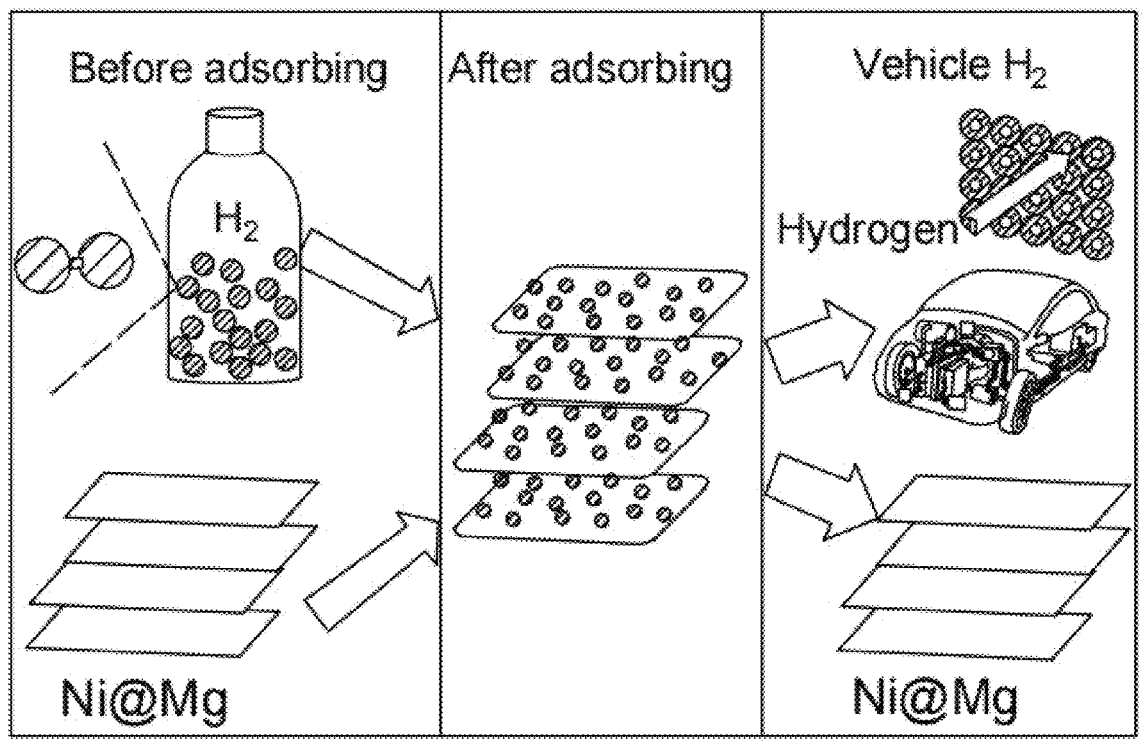
FIG. 6F shows a schematic diagram of application of the Ni@Mg nanomaterial in vehicle mounted hydrogen storage prepared in Example 3.

In order to explore the effect of Ni@Mg nanomaterial on the hydrogen absorption and desorption performance of the system, the isothermal and non-isothermal hydrogen absorption and desorption performance of pure magnesium and the Ni@Mg nanomaterial are tested, and the hydrogenated and dehydrogenated samples are characterized by XRD, as shown in FIG. 5 and FIG. 9A-D. The peak at 49.5° belongs to $MgH_2$, and the intensity of the peak becomes weaker after dehydrogenation. Due to the addition of nickel to magnesium, at 300° C., the Mg@Ni may absorb about 7.5 wt. % hydrogen in 10 min (FIG. 6A). According to the Arrhenius type linear fitting of lnk vs.1000/T given in FIG. 6C and FIG. 6D, the Ni@Mg nanomaterial has an Ea value of 59 kJ/mol $H_2$, which is lower than that of pure magnesium (87 kJ/mol $H_2$). The Ni@Mg nanomaterial desorbs 6.9 wt. % hydrogen, which is higher than that of pure magnesium desorbing 5.2 wt. % hydrogen at 330° C. for 45 min. The Ni@Mg nanomaterial has tested the hydrogen cycle. The corresponding reversible cycle model is shown in FIG. 6E, which shows the hydrogen storage capacity that still maintains temperature in the hydrogen absorption/desorption cycle. The Ni@Mg nanomaterial have stable adsorption capacity. The Ni@Mg nanomaterial is expected to realize the value of hydrogen absorption/desorption applications to improve the practicability of hydrogen storage materials for vehicles (FIG. 6F).

Figure 7A:
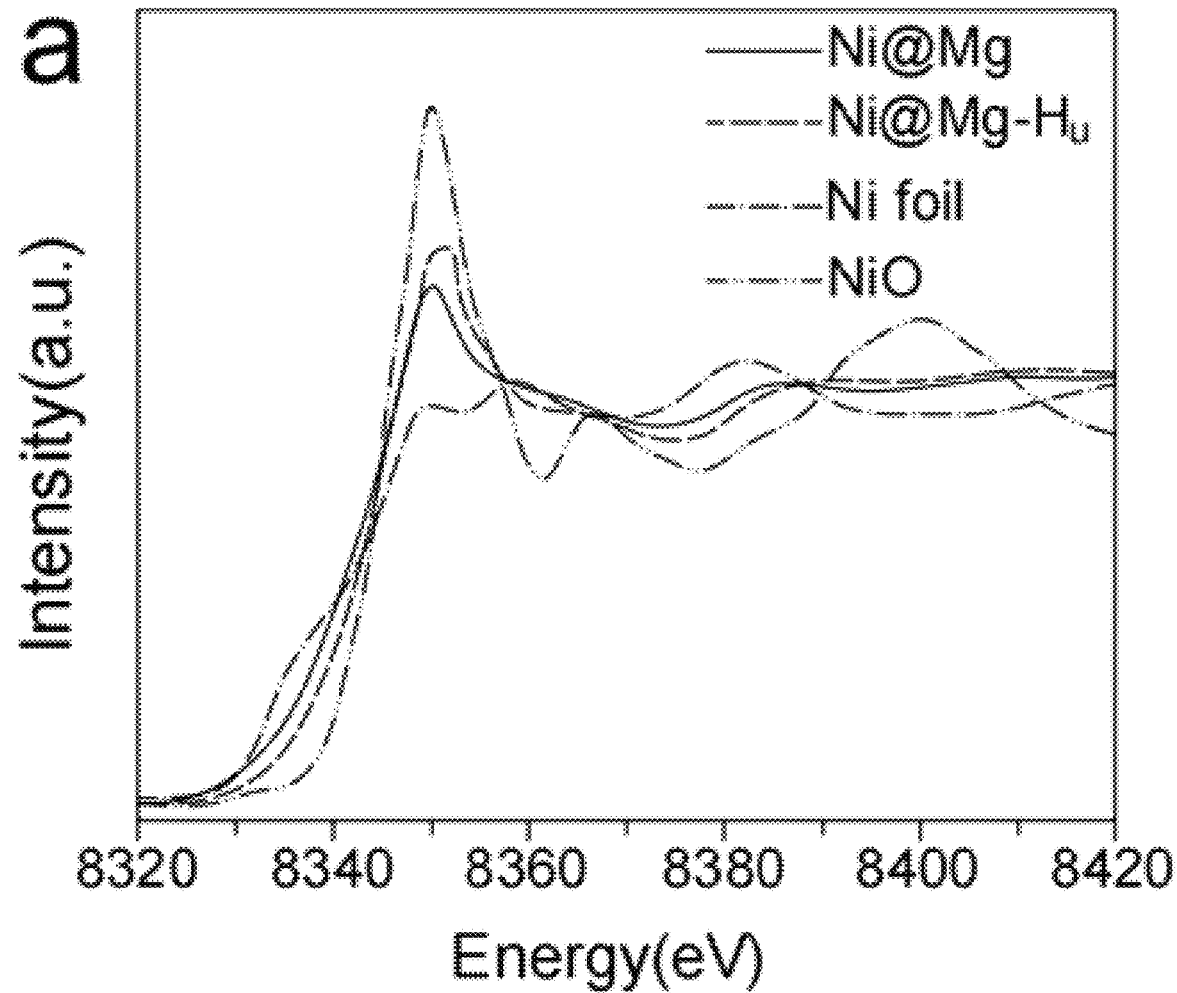
FIG. 7A shows a standardized X-ray absorption near-edge structure (XANES) spectrum of the Ni@Mg nanomaterial prepared in Example 3.
Figure 7B:
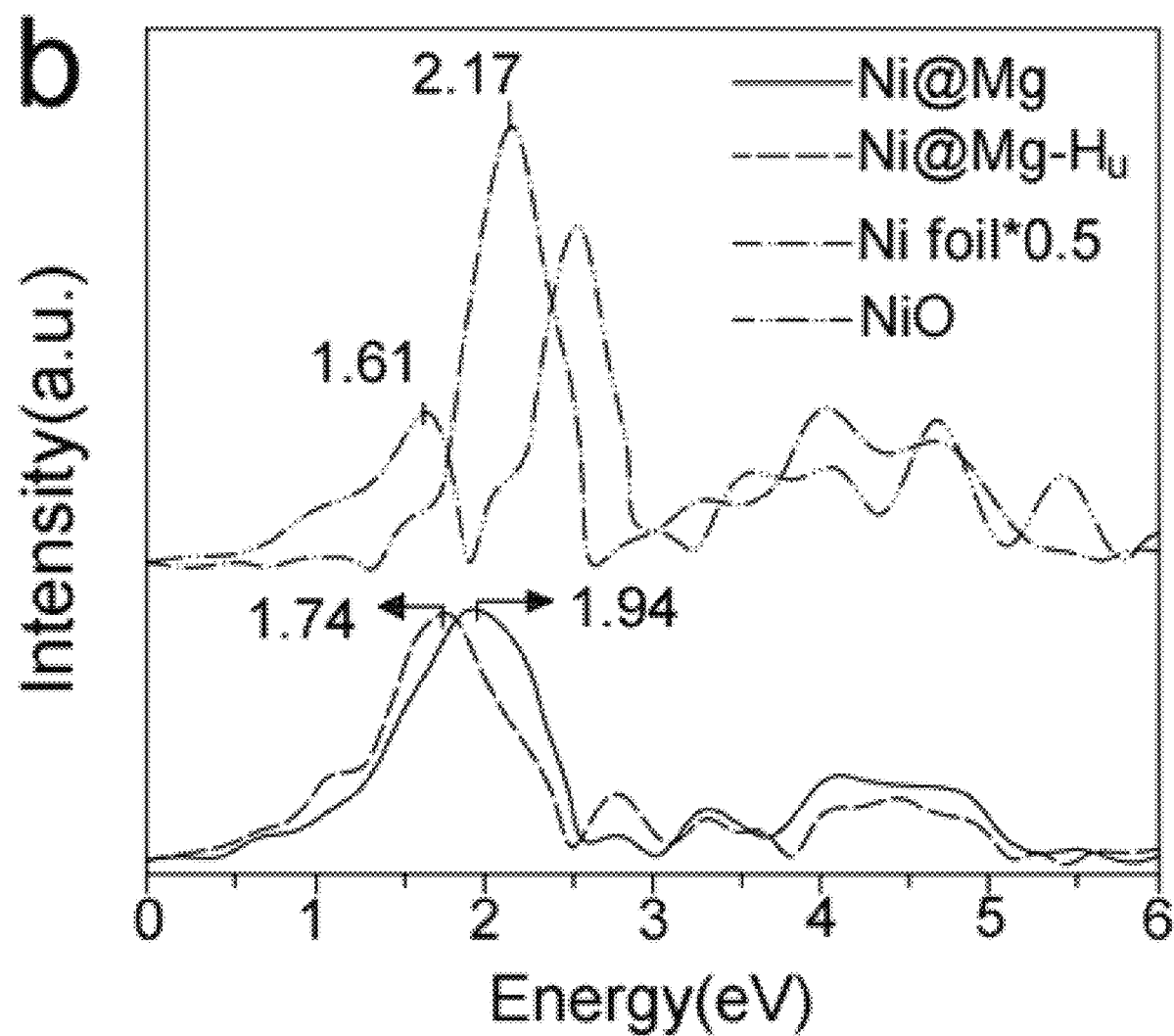
FIG. 7B shows a spectrum of Ni@Mg, Ni@Mg—$H_u$, nickel, and nickel oxide characterized by Fourier transformed extended X-ray absorption fine structure (FT-EXAFS) in Example 3.
Figure 7C:
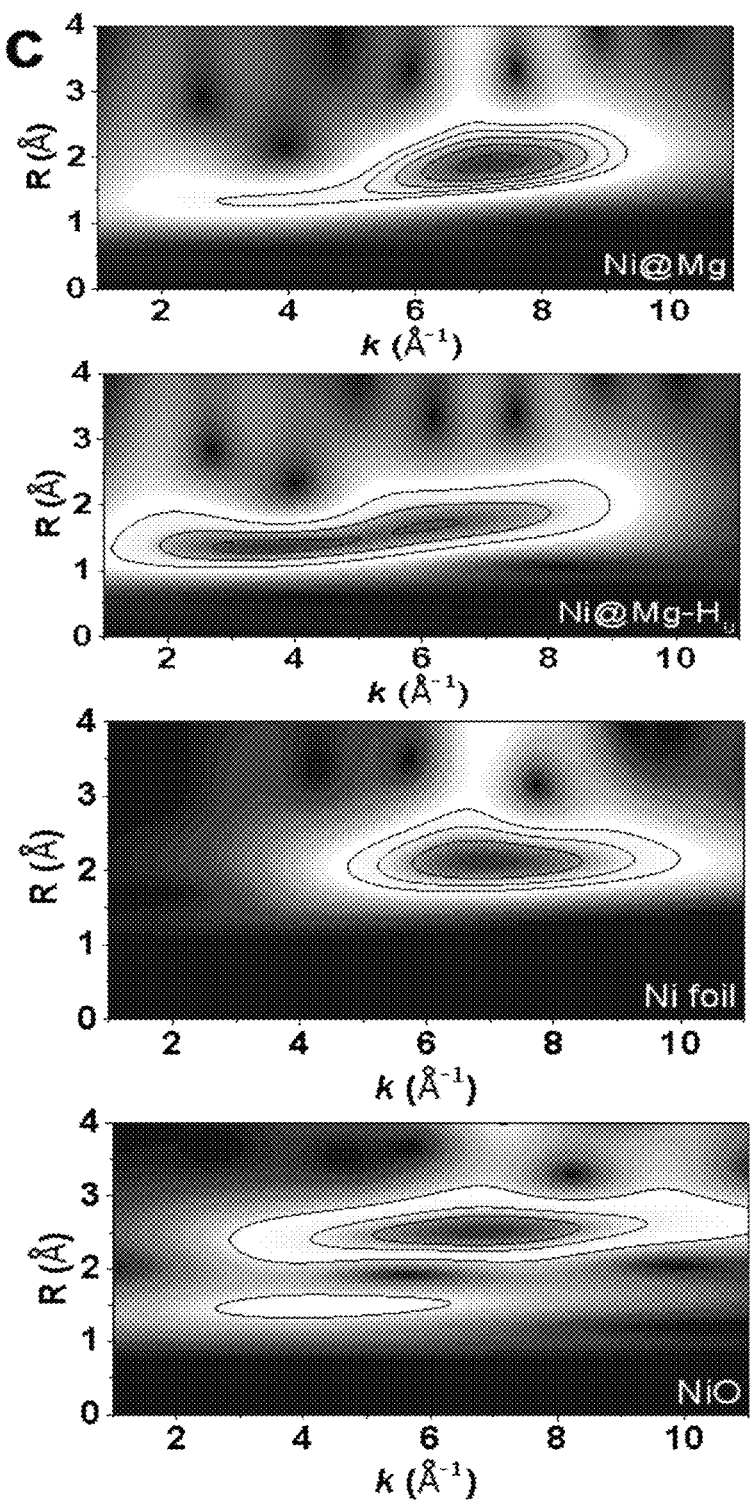
FIG. 7C shows corresponding wavelet transform extended X-ray absorption fine structure (WT-EXAFS) spectra in Example 3.
Figure 7D:
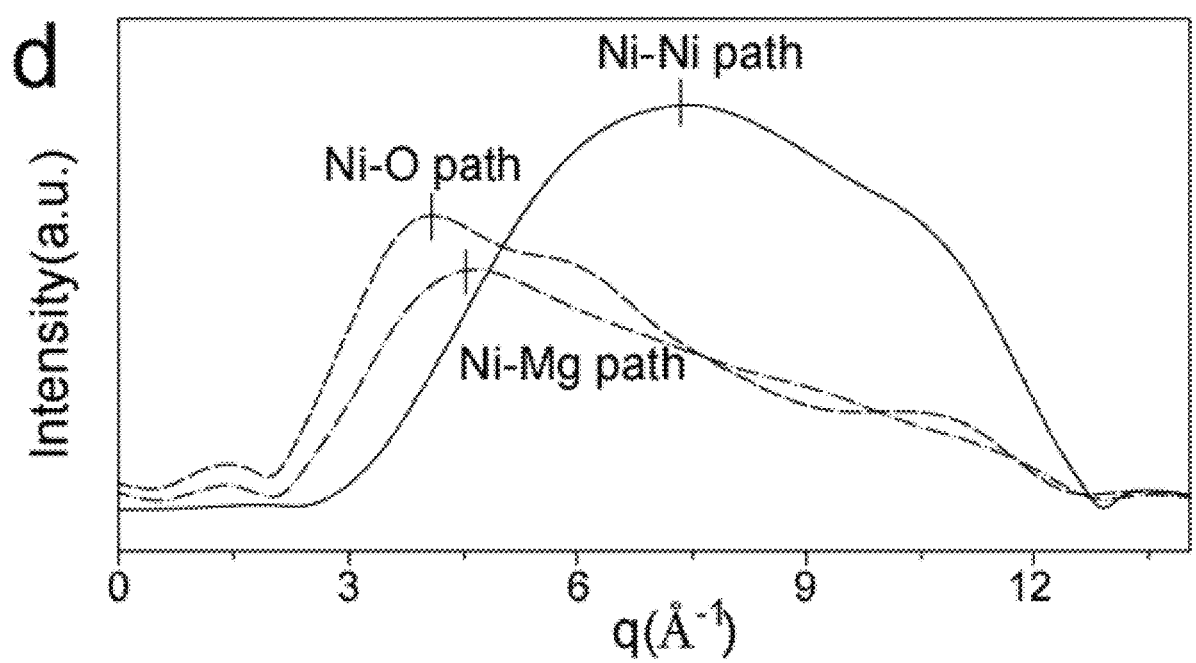
FIG. 7D shows extended X-ray absorption fine structure (EXAFS) path comparison in Example 3.
Figure 7E:
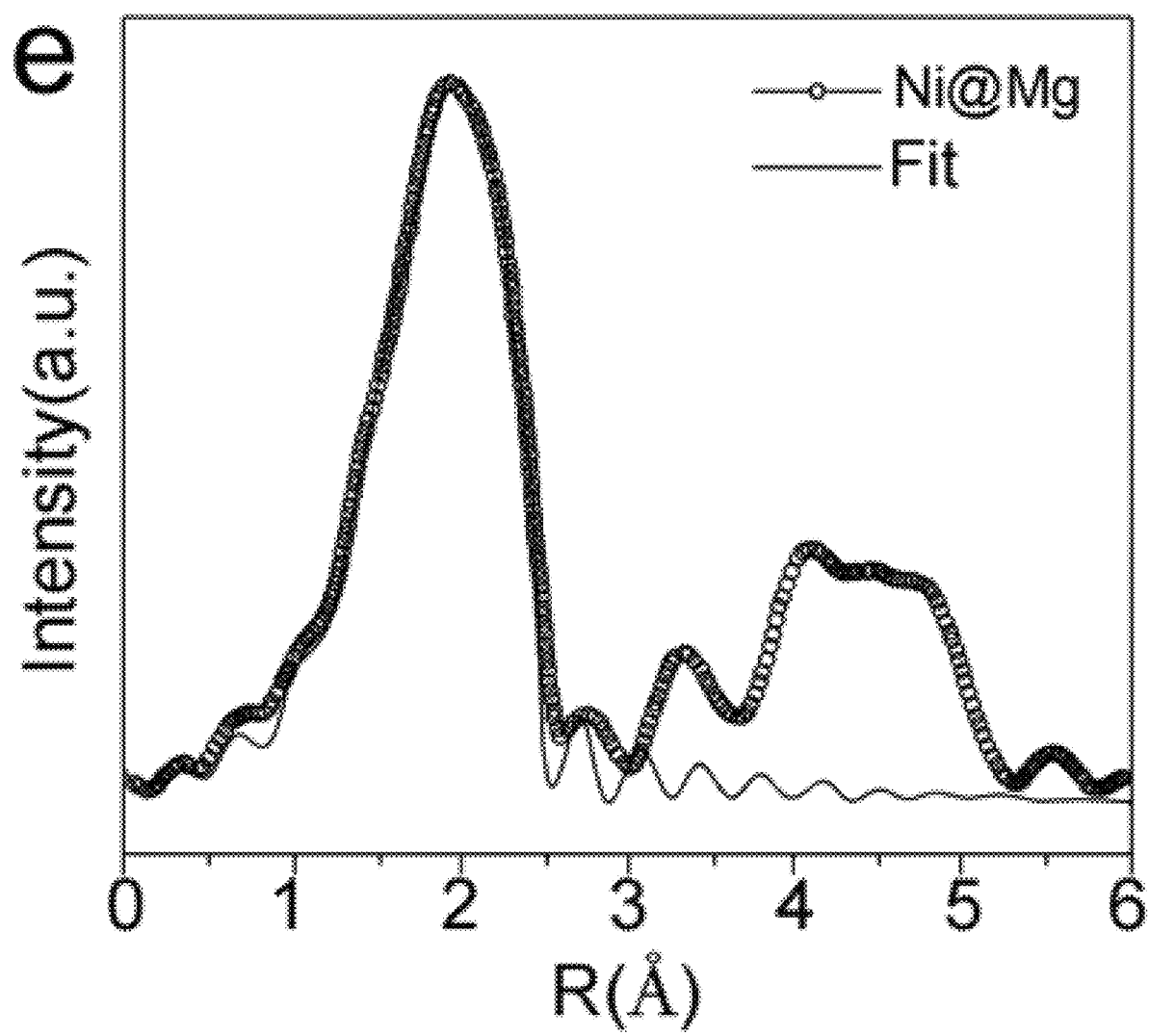
FIG. 7E shows a quantitative EXAFS fitting and experimental curve of the Ni@Mg nanomaterial in Example 3.
Figure 7F:
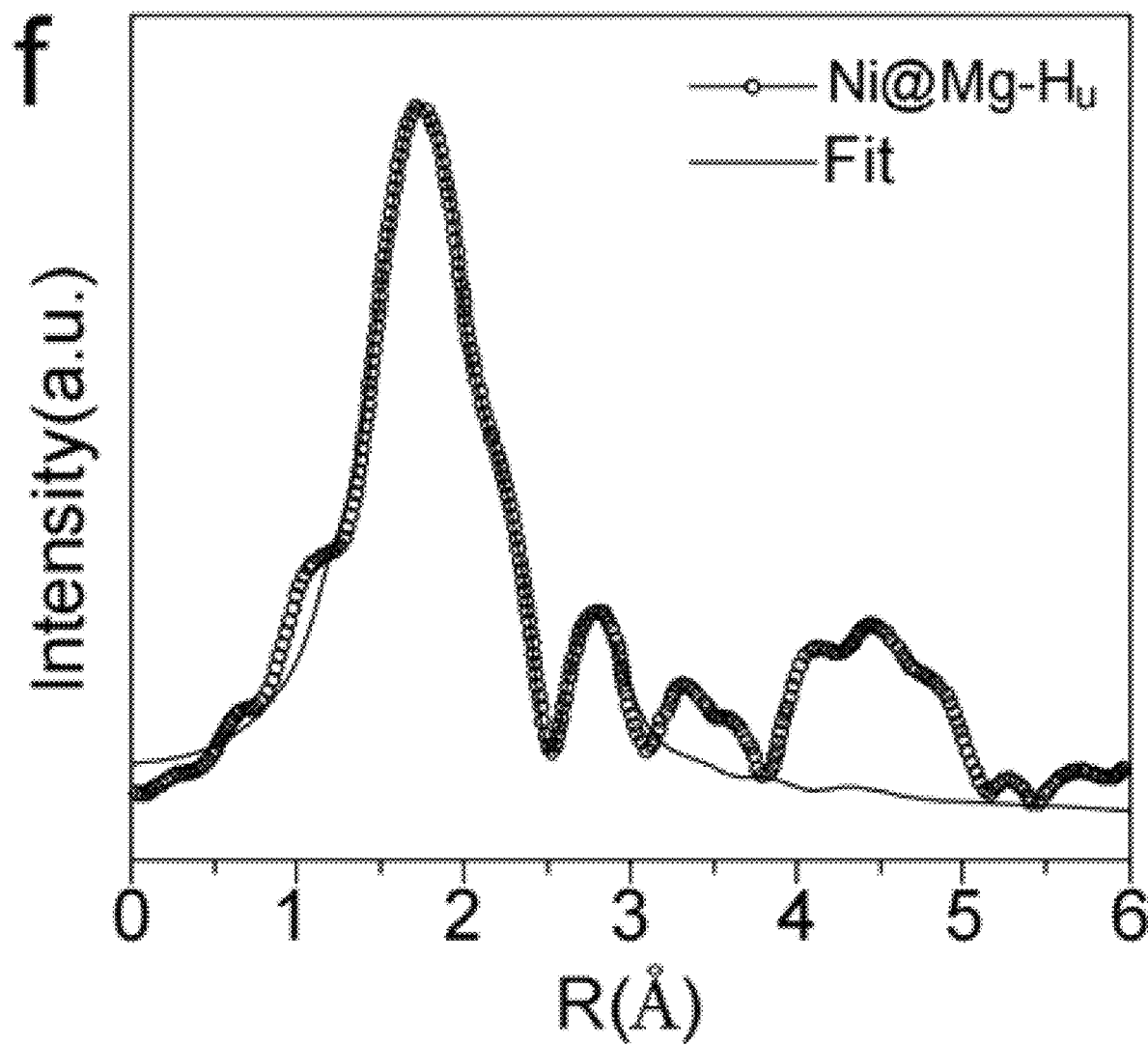
FIG. 7F shows a quantitative EXAFS fitting and experimental curve of Ni@Mg—$H_u$ in Example 3.

(4) The electronic and geometric structures of the Ni@Mg nanomaterial prepared in Example 3 and the hydrogenated Ni@Mg nanomaterial at an atomic level were studied using the XANES and EXAFS techniques. As shown in FIG. 7A, this indicates that hydrogenation causes slight oxidation of nickel atoms. In the FT-EXAFS curve (FIG. 7B), the Ni@Mg nanomaterial and the hydrogenated Ni@Mg show significant peaks at 1.94 Å and 1.74 Å, which may contain overlapping profiles of Ni—O and Ni—Ni/Mg. The WT-EXAFS analysis makes use of its advantages in identifying the scattering path not only in R space but also in K space to clearly verify this hypothesis. According to the Ni@Mg nanomaterial and the hydrogenated Ni@Mg (FIG. 7C), the k-axis coordinate of CM is mainly determined by the atomic number (Z) of the scattering atom, and their correlation may be accurately reflected by the size of q space of the research path, as shown in FIG. 7D. Therefore, CMs with low k values, Ni@Mg and Ni@Mg—$H_u$ are clearly attributed to Ni—O, which is also consistent with Ni—O in NiO references (FIG. 7C). Similarly, the high k value may be attributed to the Ni—Ni path, as it is consistent with the magnitude of the relevant q space and the experimental evidence from the Ni foil (FIG. 7C). For the hydrogenated Ni@Mg (Ni@Mg—$H_u$), the peaks at 29.7° and 41.3° belong to MgNi (a=2.9849 Å, b=2.9849 Å, and c=3.1600 Å), which may be that Mg atoms diffuse to Ni atoms in the process of temperature-programmed heating and hydrogen absorption and finally form stable MgNi compounds. The peak of metal Ni moves to 44.4° and 45.5°, which may be considered as the increase of $MgNi_2$.

Figure 8A:
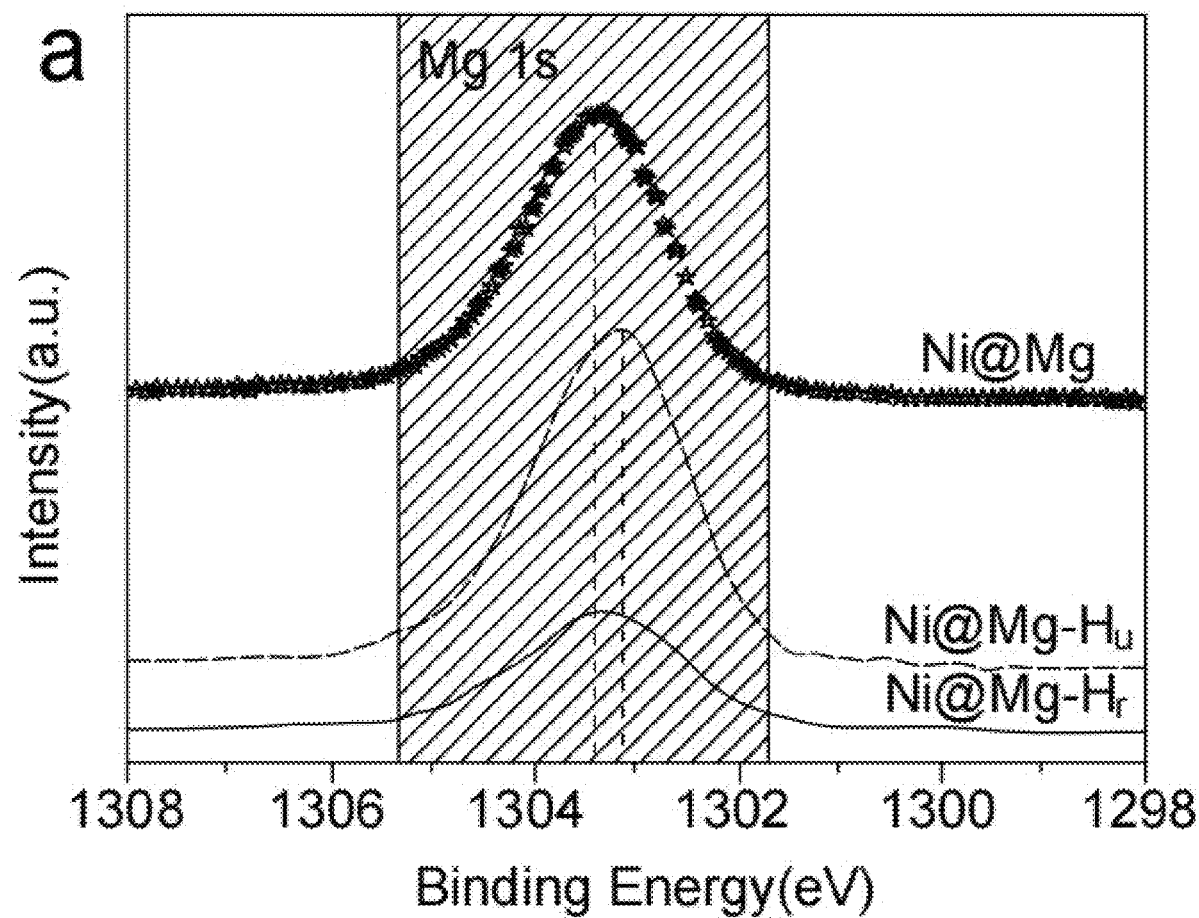
FIG. 8A shows Mg is area in an X-ray photoelectron spectroscopy (XPS) spectra of the Ni@Mg nanomaterial and Ni@Mg—$H_u$ prepared in Example 3.
Figure 8B:
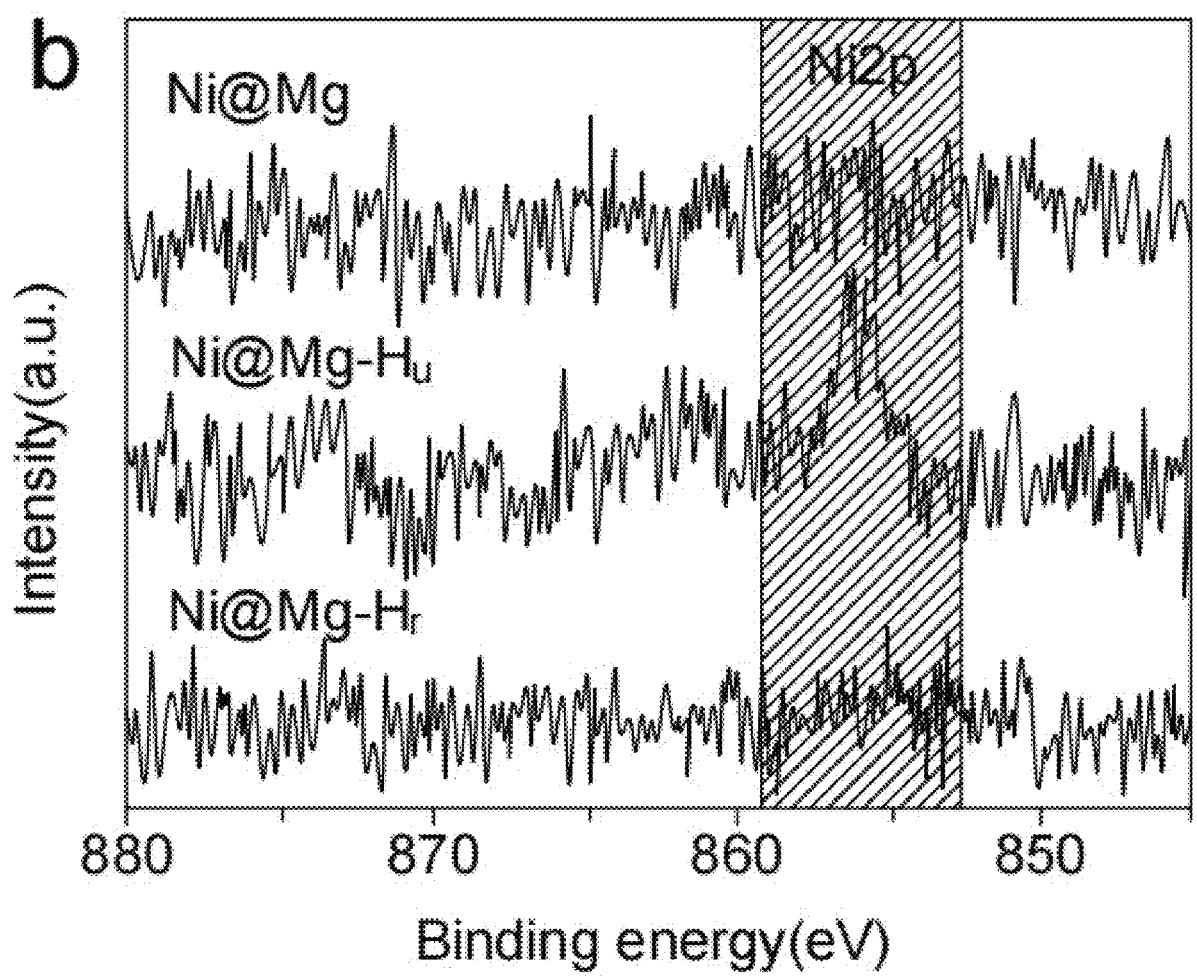
FIG. 8B shows Ni 2p area in an X-ray photoelectron spectroscopy (XPS) spectra of the Ni@Mg nanomaterial and Ni@Mg—$H_u$ prepared in Example 3.
Figure 9A:
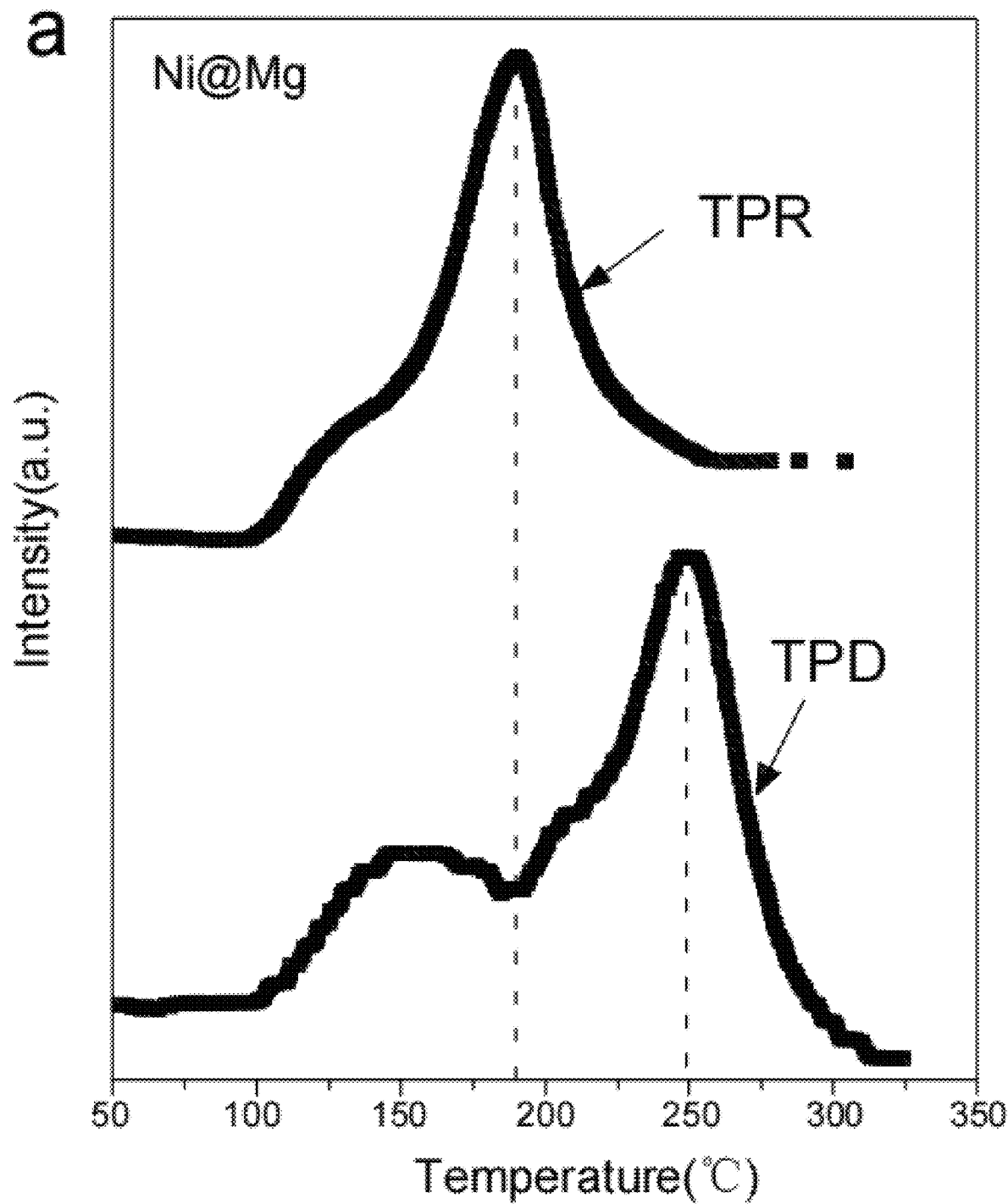
FIG. 9A-D show hydrogen absorption and desorption curves of pure magnesium.
Figure 9B:
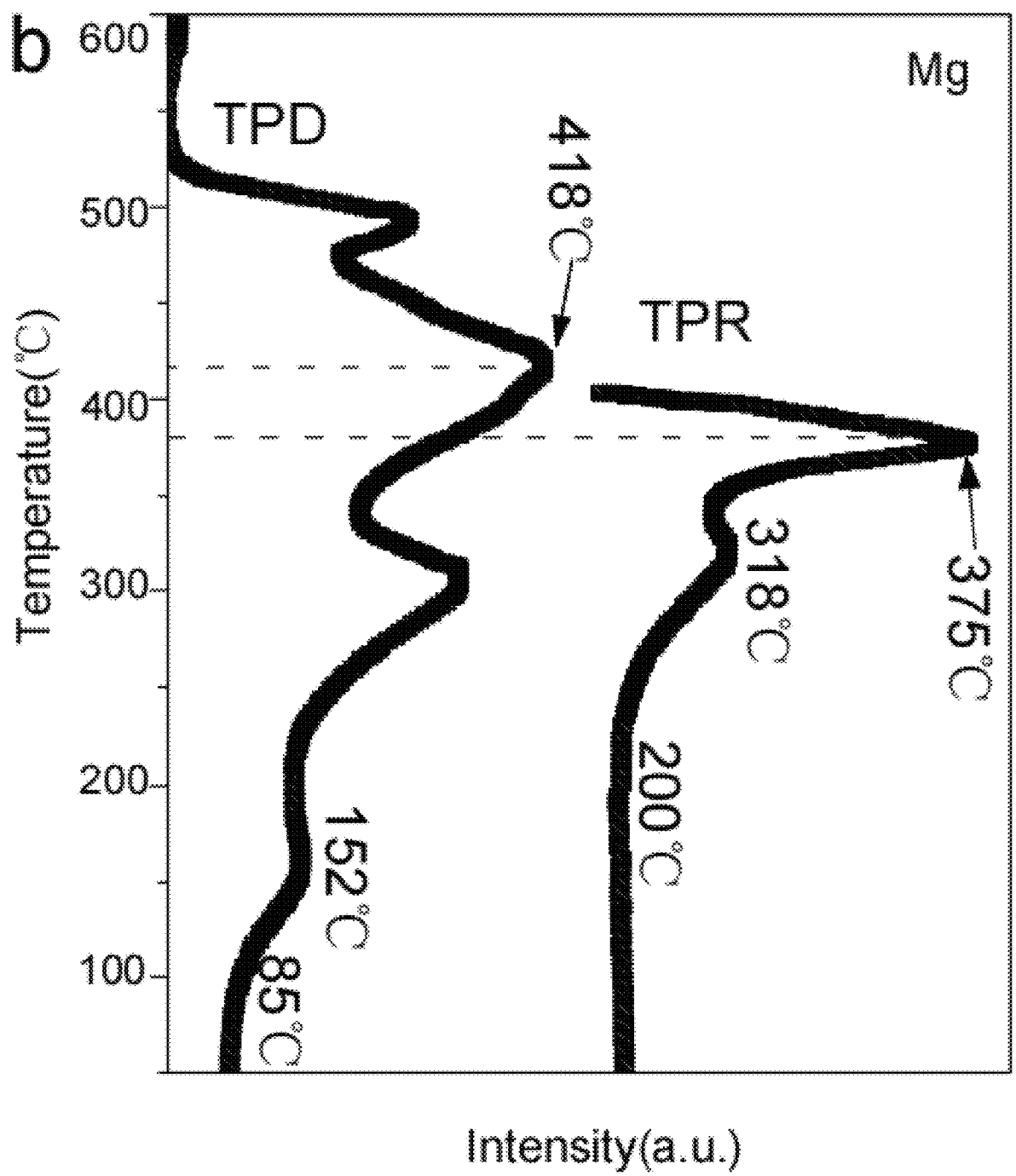
Figure 9C:
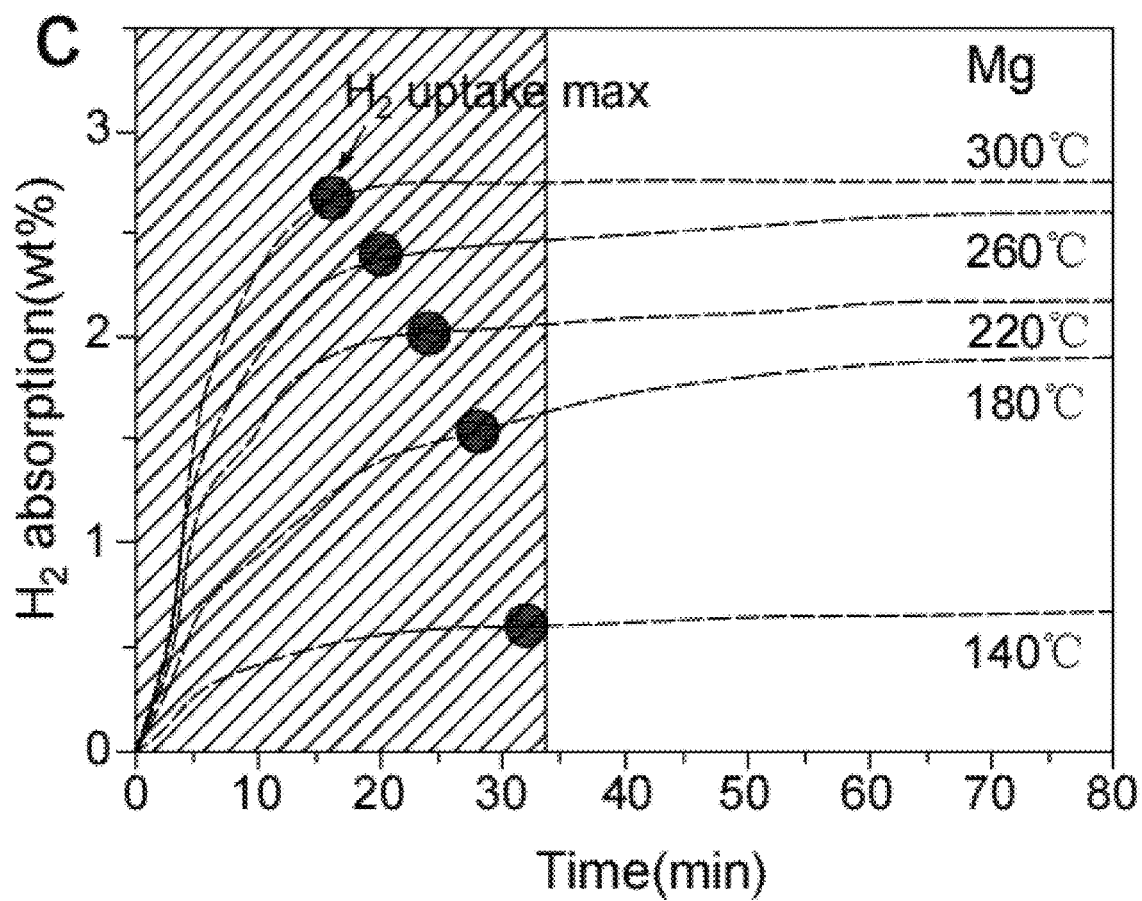
Figure 9D:
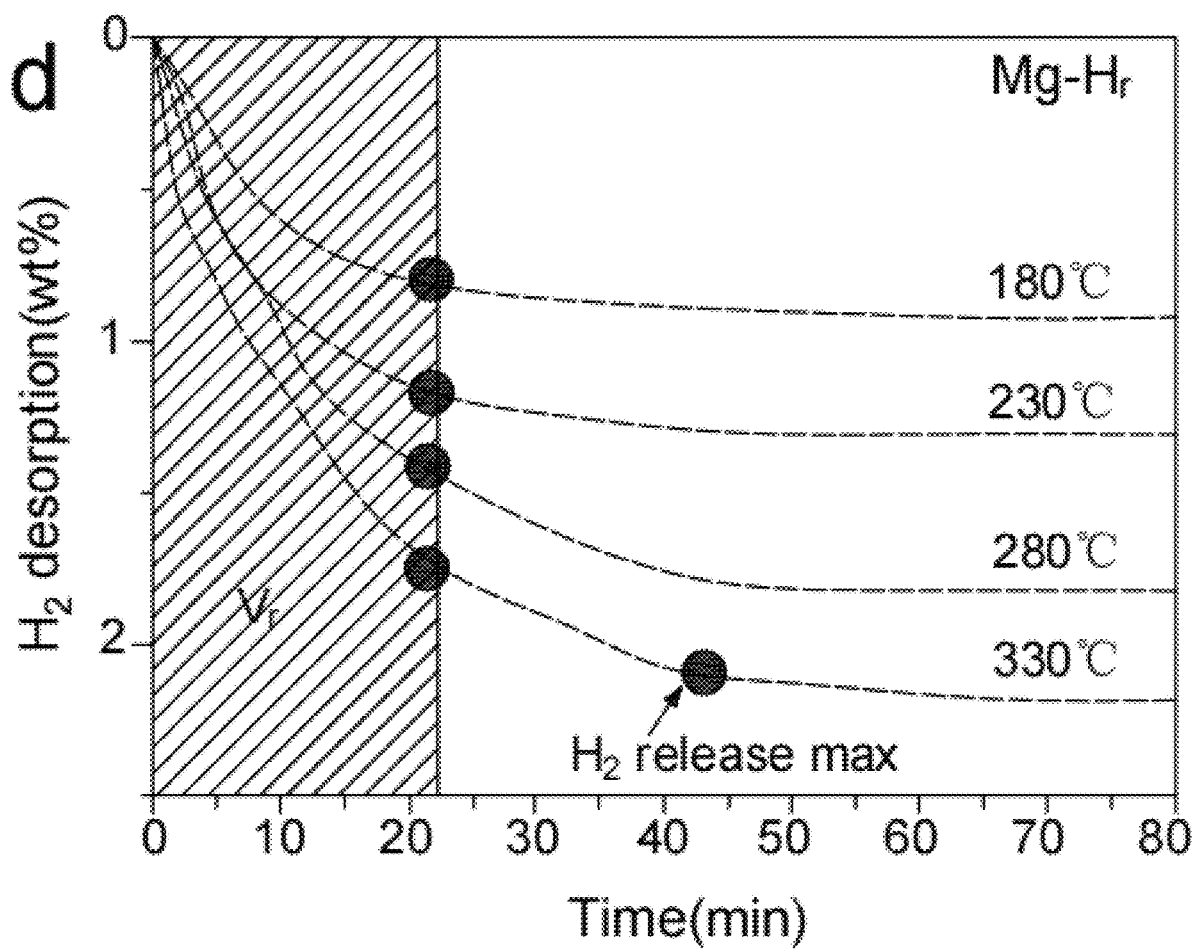

(5) XPS spectra of the Ni@Mg nanomaterial prepared in Example 3 were tested. The XPS spectrum of Ni 2p may be observed in the hydrogenated Ni@Mg, and the spectrum at 856.2 eV position may be observed in the Ni@Mg nanomaterial, as shown in FIG. 8A-B. The Ni@Mg nanomaterial is located at 1,303.3 eV, and Mg is of the hydrogenated Ni@Mg shifts to 1,303.1 eV, indicating the formation of MgNi after hydrogenation. A unique Ni/Mg path (without phase shift) of 2.80 Å is only detected in hydrogenated Ni@Mg—Hu (FIG. 6B) with a radial distance estimated to be 3.06 Å. Such strong Ni/Mg coordination at about 3.1 Å belongs to the MgNi phase, which is consistent with the XRD results. It may be considered that the MgNi compound is formed by the combination of element Ni with its surrounding Mg atoms and the diffusion of Mg atoms in the hydrogenation process.

(6) Table 1 shows the comparison of hydrogen storage capacity and temperature between an existing magnesium based catalyst and the Ni@Mg nanomaterial of the present disclosure.

TABLE 1

Comparison of hydrogen storage capacity and temperature between existing magnesium based catalysts and Ni @ Mg nanomaterial

| Material | Tested hydrogen storage mass fraction (wt. %) | Hydrogen absorption temperature (° C.) |
| --- | --- | --- |
| $Mg_2Ni$ | 3.4-3.6 | >327 |
| $MgH_2$-LiNH | 4-6 | >227 |
| Carbon-based, MOFs, h-BN material | 2-3 | −196 |
| $LaNi_5$ | 1-3 | 327 |
| $MgNi_xM_{0.03}$ (M = Cr, Fe, Co, Mn) | 3.0-3.9 | >327 |
| $Mg(BH_4)_2(NH_3)_2$ | 3-5 | >227 |
| Pt doped $Mg_2Ni$ | 6-7 | >227 |
| Ti doped $Mg_2Ni$ | 2-3 | >227 |
| Mg-PMMA (polymethylmethaacrylate) | 4.5-5.5 | >327 |
| La doped $Mg_2Ni$ | 3-5 | >277 |
| Mg-RE | 3-5 | >327 |
| Example3 | 7.5% | 200 |

In Table 1, the tested hydrogen storage mass fraction (wt. %) refers to the mass of hydrogen added after hydrogenation/the mass of hydride after hydrogenation.

The test shows that under the condition of 2.0 MPa hydrogen pressure and 200° C., at 220° C., the hydrogen absorption rate in 10 min is 7.5 wt. %, and the dehydrogenation rate in 40 min is 6.9 wt. %, which is much higher than the actual hydrogen storage capacity of magnesium (2.7 wt. %). The experiment shows that MgNi and $MgNi_2$ phases are formed in the hydrogenation process. Ni is conducive to hydrogenation, and the MgNi phase formed by hydrogenation is conducive to subsequent dehydrogenation. The trace nickel-compounded layered magnesium composite material provided by the present disclosure has high hydrogen storage capacity, high hydrogen absorption and desorption efficiency, and excellent cycle stability.

The above descriptions are merely preferred implementations of the present disclosure. It should be noted that those of ordinary skill in the art may further make several improvements and modifications without departing from the principle of the present disclosure, but such improvements and modifications should be deemed as falling within the protection scope of the present disclosure Various embodiments of the disclosure may have one or more of the following effects. In some embodiments, the disclosure provides a trace nickel-compounded layered magnesium composite material which has high hydrogen storage capacity, high hydrogen absorption and desorption efficiency, and excellent cycle stability. In other embodiments, the present disclosure provides a trace nickel-compounded layered magnesium composite material and a preparation method and use thereof. The trace nickel-compounded layered magnesium composite material provided by the present disclosure has high hydrogen storage capacity, high hydrogen absorption and desorption efficiency, excellent cycle stability, and high cost-effectiveness.

In further embodiments, the present disclosure provides a trace nickel-compounded layered magnesium composite material, including a nano-layered magnesium matrix and nano nickel distributed on a surface and between inner layers of the nano-layered magnesium matrix. In the present disclosure, the nano-layered magnesium matrix has low desorption temperature and high hydrogen storage capacity. The nano nickel distributed on the surface and between the layers of the nano-layered magnesium matrix may regulate the electron migration of the active center of the magnesium matrix, which may provide channels and active sites for the dissociation of $H_2$ molecules and the diffusion of H atoms. In addition, the Ni phase may prevent the oxidation of magnesium, and the hydrogen adsorption energy is lower than that of MgO, which is conducive to hydrogen absorption and improves the hydrogen diffusion capacity. In addition, magnesium based materials doped with nano nickel may form a large number of unsaturated hydrides through hydrogenation, reducing the desorption energy of hydrides. In the present disclosure, the trace nickel-compounded layered magnesium composite material forms the MgNi phase during hydrogenation, and the hydrogen desorption energy barrier of MgNi is low, which is conducive to subsequent dehydrogenation. Therefore, the trace nickel-compounded layered magnesium composite material provided by the present disclosure has high hydrogen storage capacity, high hydrogen absorption and desorption efficiency, excellent cycle stability, and high cost-effectiveness Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A trace nickel-compounded layered magnesium composite material, comprising a nano-layered magnesium matrix and nano nickel distributed on a surface and between inner layers of the nano-layered magnesium matrix;
   wherein:
   the nano-layered magnesium matrix has a surface area size of 100-200 $nm^2$, a layer thickness of 10-200 nm, and a layer spacing of 10-100 nm;

the nano nickel accounts for 2-6% mass content of the trace nickel-compounded layered magnesium composite material; and the nano nickel has a particle size of 3-50 nm; and wherein the trace nickel-compounded layered magnesium composite material is prepared by:

mixing magnesium powder, nickel salt, and an organic solvent;

conducting solid-liquid separation to obtain a mixture; and calcining the mixture in a reducing atmosphere to obtain the trace nickel-compounded layered magnesium composite material;

wherein:

the nickel salt is selected from the group consisting of nickel acetylacetonate, nickel acetate, and nickel carbonate;

the magnesium powder and the nickel salt have a mass ratio of 1:(0.1-0.3);

the organic solvent is selected from the group consisting of tetrahydrofuran (THF), dichloromethane, and tetrachloromethane; and the mixture is calcined at 600-900° C. for 20-60 min.

\* \* \* \* \*